US008533532B2

(12) United States Patent
Wenig et al.

(10) Patent No.: US 8,533,532 B2
(45) Date of Patent: *Sep. 10, 2013

(54) SYSTEM IDENTIFYING AND INFERRING WEB SESSION EVENTS

(75) Inventors: Robert I. Wenig, San Francisco, CA (US); Manoj Punjabi, San Francisco, CA (US); Geoff Townsend, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 245 days.

This patent is subject to a terminal disclaimer.

(21) Appl. No.: 12/822,137

(22) Filed: Jun. 23, 2010

(65) Prior Publication Data

US 2011/0320880 A1 Dec. 29, 2011

(51) Int. Cl.
*G06F 11/00* (2006.01)
(52) U.S. Cl.
USPC ............. 714/33; 714/25; 714/46; 715/234; 709/203; 709/224
(58) Field of Classification Search
USPC ......... 714/38, 46, 33, 25; 715/234; 709/203, 709/224
See application file for complete search history.

(56) References Cited

U.S. PATENT DOCUMENTS

| | | | |
|---|---|---|---|
| 5,463,547 A | 10/1995 | Markowitz | |
| 5,564,043 A | 10/1996 | Siefert | |
| 5,577,254 A | 11/1996 | Gilbert | |
| 5,699,526 A | 12/1997 | Siefert | |
| 5,715,314 A | 2/1998 | Payne | |
| 5,717,879 A | 2/1998 | Moran et al. | |
| 5,721,906 A | 2/1998 | Siefert | |
| 5,751,962 A | 5/1998 | Fanshier et al. | |
| 5,774,552 A | 6/1998 | Grimmer | |
| 5,781,735 A | 7/1998 | Southard | |
| 5,809,250 A | 9/1998 | Kisor | |
| 5,825,880 A | 10/1998 | Sudia | |
| 5,832,458 A | 11/1998 | Jones | |
| 5,832,496 A | 11/1998 | Anand et al. | |
| 5,845,124 A | 12/1998 | Berman | |
| 5,848,396 A | 12/1998 | Gerace | |

(Continued)

FOREIGN PATENT DOCUMENTS

| | | |
|---|---|---|
| CA | 2656539 | 2/2008 |
| CA | 2696884 | 3/2009 |

(Continued)

OTHER PUBLICATIONS

Stolowitz Ford Cowger Listing of Related Cases Mar. 15, 2012.

(Continued)

*Primary Examiner* — Loan L. T. Truong
(74) *Attorney, Agent, or Firm* — Stolowitz Ford Cowger LLP

(57) ABSTRACT

A test system uses an instrumented browser to identify events that were not successfully captured during a client web session. The identified events can be used to modify a capture system that captures the client web session. Alternatively, the test system may generate replay rules that are used by a replay system to infer the missed events while replaying of the previously captured client web session. The events can include changes to Document Object Models (DOMs) for web pages used during the web sessions. The DOMs can be used to identify significant web session events and force replay sessions into the correct states.

30 Claims, 18 Drawing Sheets

(56) References Cited

U.S. PATENT DOCUMENTS

| | | |
|---|---|---|
| 5,848,412 A | 12/1998 | Rowland et al. |
| 5,857,188 A | 1/1999 | Douglas |
| 5,867,578 A | 2/1999 | Brickell |
| 5,894,516 A | 4/1999 | Brandenburg |
| 5,903,652 A | 5/1999 | Mital |
| 5,905,868 A | 5/1999 | Baghai et al. |
| 5,909,492 A | 6/1999 | Payne |
| 5,930,786 A | 7/1999 | Carino, Jr. et al. |
| 5,933,601 A | 8/1999 | Fanshier et al. |
| 5,941,957 A | 8/1999 | Ingrassia, Jr. et al. |
| 5,951,643 A | 9/1999 | Shelton et al. |
| 5,951,652 A | 9/1999 | Ingrassia, Jr. et al. |
| 5,954,798 A | 9/1999 | Shelton et al. |
| 5,991,791 A | 11/1999 | Siefert |
| 6,006,228 A | 12/1999 | McCollum et al. |
| 6,026,403 A | 2/2000 | Siefert |
| 6,035,332 A | 3/2000 | Ingrassia, Jr. et al. |
| 6,085,223 A | 7/2000 | Carino, Jr. et al. |
| 6,151,584 A | 11/2000 | Papierniak et al. |
| 6,151,601 A | 11/2000 | Papierniak et al. |
| 6,169,997 B1 | 1/2001 | Papierniak et al. |
| 6,182,097 B1 | 1/2001 | Hansen et al. |
| 6,253,203 B1 | 6/2001 | O'Flaherty et al. |
| 6,286,030 B1* | 9/2001 | Wenig et al. ............... 709/203 |
| 6,286,046 B1* | 9/2001 | Bryant ....................... 709/224 |
| 6,286,098 B1 | 9/2001 | Wenig |
| 6,295,550 B1 | 9/2001 | Choung et al. |
| 6,317,794 B1 | 11/2001 | Papierniak et al. |
| 6,334,110 B1 | 12/2001 | Walter et al. |
| 6,397,256 B1 | 5/2002 | Chan |
| 6,418,439 B1 | 7/2002 | Papierniak et al. |
| 6,480,855 B1 | 11/2002 | Siefert |
| 6,489,980 B1 | 12/2002 | Scott et al. |
| 6,502,096 B1 | 12/2002 | Siefert |
| 6,519,600 B1 | 2/2003 | Siefert |
| 6,651,072 B1 | 11/2003 | Carino, Jr. et al. |
| 6,658,453 B1 | 12/2003 | Dattatri |
| 6,671,687 B1 | 12/2003 | Pederson et al. |
| 6,714,931 B1 | 3/2004 | Papierniak et al. |
| 6,766,333 B1 | 7/2004 | Wu et al. |
| 6,850,975 B1* | 2/2005 | Danneels et al. ........... 709/224 |
| 7,076,495 B2 | 7/2006 | Dutta et al. |
| 7,260,837 B2 | 8/2007 | Abraham et al. |
| 7,272,639 B1 | 9/2007 | Levergood |
| 7,278,105 B1 | 10/2007 | Kitts |
| 7,293,281 B1* | 11/2007 | Moran et al. ................ 726/3 |
| 7,490,319 B2* | 2/2009 | Blackwell et al. ......... 717/124 |
| 7,580,996 B1 | 8/2009 | Allan |
| RE41,903 E | 10/2010 | Wenig |
| 8,042,055 B2 | 10/2011 | Wenig |
| 8,127,000 B2 | 2/2012 | Wenig |
| 8,219,531 B2 | 7/2012 | Eagan et al. |
| 8,381,088 B2* | 2/2013 | Kikin-Gil et al. .......... 715/205 |
| 2002/0049840 A1 | 4/2002 | Squire |
| 2002/0056091 A1 | 5/2002 | Bala |
| 2002/0065912 A1* | 5/2002 | Catchpole et al. ......... 709/224 |
| 2002/0070953 A1 | 6/2002 | Barg et al. |
| 2002/0083183 A1 | 6/2002 | Pujare et al. |
| 2002/0165954 A1 | 11/2002 | Eshghi et al. |
| 2003/0023715 A1 | 1/2003 | Reiner et al. |
| 2003/0128233 A1 | 7/2003 | Kasriel |
| 2003/0145071 A1 | 7/2003 | Straut |
| 2003/0154289 A1 | 8/2003 | Williamson et al. |
| 2004/0019675 A1 | 1/2004 | Hebeler |
| 2004/0059809 A1* | 3/2004 | Benedikt et al. ........... 709/224 |
| 2004/0100507 A1* | 5/2004 | Hayner et al. ............. 345/855 |
| 2005/0021713 A1 | 1/2005 | Dugan et al. |
| 2005/0030966 A1* | 2/2005 | Cai et al. ................... 370/432 |
| 2005/0033803 A1* | 2/2005 | Vleet et al. ................ 709/203 |
| 2005/0066037 A1 | 3/2005 | Song et al. |
| 2005/0071464 A1 | 3/2005 | Kuwata et al. |
| 2005/0086606 A1* | 4/2005 | Blennerhassett et al. ..... 715/760 |
| 2005/0188080 A1 | 8/2005 | Motsinger et al. |
| 2005/0246651 A1 | 11/2005 | Krzanowski |
| 2005/0278565 A1 | 12/2005 | Frattura et al. |
| 2006/0048214 A1 | 3/2006 | Pennington et al. |
| 2006/0075088 A1 | 4/2006 | Guo |
| 2006/0117055 A1 | 6/2006 | Doyle |
| 2006/0123340 A1 | 6/2006 | Bailey et al. |
| 2007/0106692 A1* | 5/2007 | Klein ....................... 707/104.1 |
| 2007/0226314 A1 | 9/2007 | Eick |
| 2008/0005793 A1* | 1/2008 | Wenig et al. ................ 726/22 |
| 2008/0034036 A1 | 2/2008 | Takeshima et al. |
| 2008/0046562 A1 | 2/2008 | Butler |
| 2008/0052377 A1 | 2/2008 | Light |
| 2008/0184129 A1 | 7/2008 | Cancel et al. |
| 2008/0216094 A1 | 9/2008 | Anderson |
| 2008/0294974 A1 | 11/2008 | Nurmi et al. |
| 2009/0013347 A1 | 1/2009 | Ahanger |
| 2009/0019133 A1* | 1/2009 | Brimley ...................... 709/218 |
| 2009/0037517 A1 | 2/2009 | Frei |
| 2009/0037914 A1 | 2/2009 | Chagoly et al. |
| 2009/0063968 A1* | 3/2009 | Wenig et al. ............... 715/704 |
| 2009/0070869 A1 | 3/2009 | Fan et al. |
| 2009/0083714 A1* | 3/2009 | Kiciman et al. ............ 717/128 |
| 2009/0138554 A1* | 5/2009 | Longobardi et al. ........ 709/204 |
| 2009/0228474 A1 | 9/2009 | Chiu et al. |
| 2009/0247193 A1 | 10/2009 | Kalavade |
| 2009/0254529 A1 | 10/2009 | Goldentouch |
| 2010/0042573 A1 | 2/2010 | Wenig |
| 2010/0058285 A1 | 3/2010 | Meijer |
| 2010/0070929 A1 | 3/2010 | Behl et al. |
| 2010/0146380 A1 | 6/2010 | Rousso |
| 2010/0211638 A1 | 8/2010 | Rougier |
| 2010/0251128 A1 | 9/2010 | Cordasco |
| 2010/0287229 A1* | 11/2010 | Hauser ....................... 709/203 |
| 2011/0029665 A1* | 2/2011 | Wenig et al. ............... 709/224 |
| 2012/0084437 A1 | 4/2012 | Wenig |
| 2012/0102101 A1 | 4/2012 | Wenig |
| 2012/0151329 A1 | 6/2012 | Cordasco |
| 2012/0173966 A1 | 7/2012 | Powell |

FOREIGN PATENT DOCUMENTS

| | | |
|---|---|---|
| EP | 0326283 | 8/1989 |
| EP | 0843449 | 5/1998 |
| EP | 1097428 | 6/2002 |
| EP | 07840244.3 | 2/2008 |
| EP | 08769998.9 | 3/2009 |
| GB | 2357680 | 6/2008 |
| WO | 9825372 | 6/1998 |
| WO | WO 98/26571 | 6/1998 |
| WO | 9836520 | 8/1998 |
| WO | 0013371 | 3/2000 |
| WO | 0217165 | 2/2002 |
| WO | 2008/019193 | 2/2008 |
| WO | 2009/029316 | 3/2009 |
| WO | 2010019258 | 2/2010 |

OTHER PUBLICATIONS

International Search Report for PCT/US09/04654; Date of mailing Oct. 2, 2009.
Written Opinion of the International Searching Authority; PCT/US09/04654; Date of mailing Oct. 2, 2009.
Holloway, et al., "Cryptographic Initialization Test", IBM Technical Dsiclsoure Bulletin, pp. 195-198, Feb. 1991.
Stolowitz Ford Cowger LLP, Listing of Related Cases; Aug. 30, 2011.
PCT Search Report for PCT/US2011/033813; Mailing Date Jul. 28, 2011.
Written Opinion of the International Searching Authority for PCT/US2011/033813; Mailing Date Jul. 28, 2011.
Smith et al., "Automated Protocol Analysis," Human Computer Interaction, 8:101-145, 1993.
Bishop, Matt et al., "A Model of Security Monitoring", Department of Mathematics and Computer Scince, Dartmouth College, pp. 46-52.
Al-Qaimare G., et al., Kaldi: A Computer-Aided Usability Engineering Tool for Supporting Testing and Analysis of Human-Computer Interation:, Computer-Aided Design of User Interfaces. Proceedings of the International Conference on Computer-Aided Design of User Interfaces, Proceedings of CADUI, xx,xx, Oct. 21, 1999, pp. 337-355.

International Search Report for PCT/US08/65582; Date of Mailing Sep. 11, 2008.
International Search Report for PCT/US2007/071096; Date of mailing May 13, 2008.
Written Opinion of the International Searching Authority for PCT/US08/65582; Mailing date Sep. 11, 2008.
Written Opinion of the International Searching Authority for PCT/US07/71096; Mailing date May 13, 2008.
Stolowitz Ford Cowger Listing of Related Cases Nov. 29, 2010.
Stolowitz Ford Cowger Listing of Related Cases May 3, 2012.
Written Opinion of the International Searching Authority; PCT/US11/35410; Date of mailing Dec. 14, 2011.
International Search Report for PCT/US11/35410; Date of mailing Dec. 14, 2011.
Reed Martin; Using Google Analytics Site Overlay; Community Spark; Apr. 13, 2007. Online: <http://www.communityspark.com/using-google-analytics-site-overlay/>.
Bishop, Matt et al., "A Model of Security Monitoring", Department of Mathematics and Computer Science, Dartmouth College, pp. 46-52. Dec. 1989.
Peter Brusilovsky et. al., "Adaptive and Intelligent Web-based Educational Systems," International Journal of Artificial Intelligence in Education, Apr. 1, 2003, pp. 159-172, XP55039152, The Netherlands Retrieved from the Internet: URL: http://www.sis.pitt.edu/~peterb/papers/AIWBES.pdf [retrieved on Sep. 25, 2012] p. 160-161.
Atterer R et al. : "Knowing the User's Every Move—User Activity Tracking for Website Usability Evaluation and Implicit Interaction," WWW '06 Procedings of the 15th World Wide Web, ACM, New York, NY, USA, May 22, 2006, pp. 203-212, XP002519605, DOI: 10.1145/1135777,1135811 ISBN 978-1-5959-323-2.
Han et al., "Using Ajax for Desktop-;like Geospatial Web Application Development," Geoinformatics, 2009 17th International Conference on Aug. 12-14, 2009, <http://geobrain.laits.gmu.edu/geobrainhome/docs/GeOnAS_Ajax.pdf>.
Lubarsky, How to Delete Cookie Using Javascript, Aug. 19, 2007, http:web.archive.org/web/20070819123555/http://blogs.x2line.com/al/articles/316.aspx.
Stolowitz Ford Cowger LLP; Listing of Related Cases; Aug. 27, 2012.
International Search Report for PCT/US12/25971; Date of mailing May 31, 2012.
Written Opinion of the International Searching Authority for PCT/US12/25971; Date of mailing May 31, 2012.

* cited by examiner

SYSTEM IDENTIFYING AND INFERRING WEB SESSION EVENTS

BACKGROUND

Users access web applications on remote web servers. In one example, the web application allows users to purchase certain products or services online. However, the user may experience problems while conducting the online purchase. For example, the web application may crash every time the user selects an icon on a web page used for an online purchase. In another situation, the user may not be able to determine how to complete the online product purchase from the instructions displayed on the web page. In another situation, the web application may prevent the user from selecting particular items. In yet another situation, the web site may slow down or crash during certain periods of time or for particular operations. These are just a few of the many problems that may arise during an online network session.

These problems can negatively affect an e-commerce business. For example, a negative user experience during the online session may cause a potential customer to give up and abort the purchase of a particular product. Even worse, the potential customer may stop visiting the enterprise web site. Accordingly, it is important to be able to monitor user experiences during web sessions and identify any problems.

Systems currently exist for monitoring web sites. However, challenges exist in accurately replaying the previously captured web session. For example, web pages used today execute code that operates more independently from the web server and contain more state information. Monitoring systems may not be able to observe and capture all of the events from these rich web pages. These missed events can prevent accurate replay of the previously captured web session.

DETAILED DESCRIPTION

Figure 1:
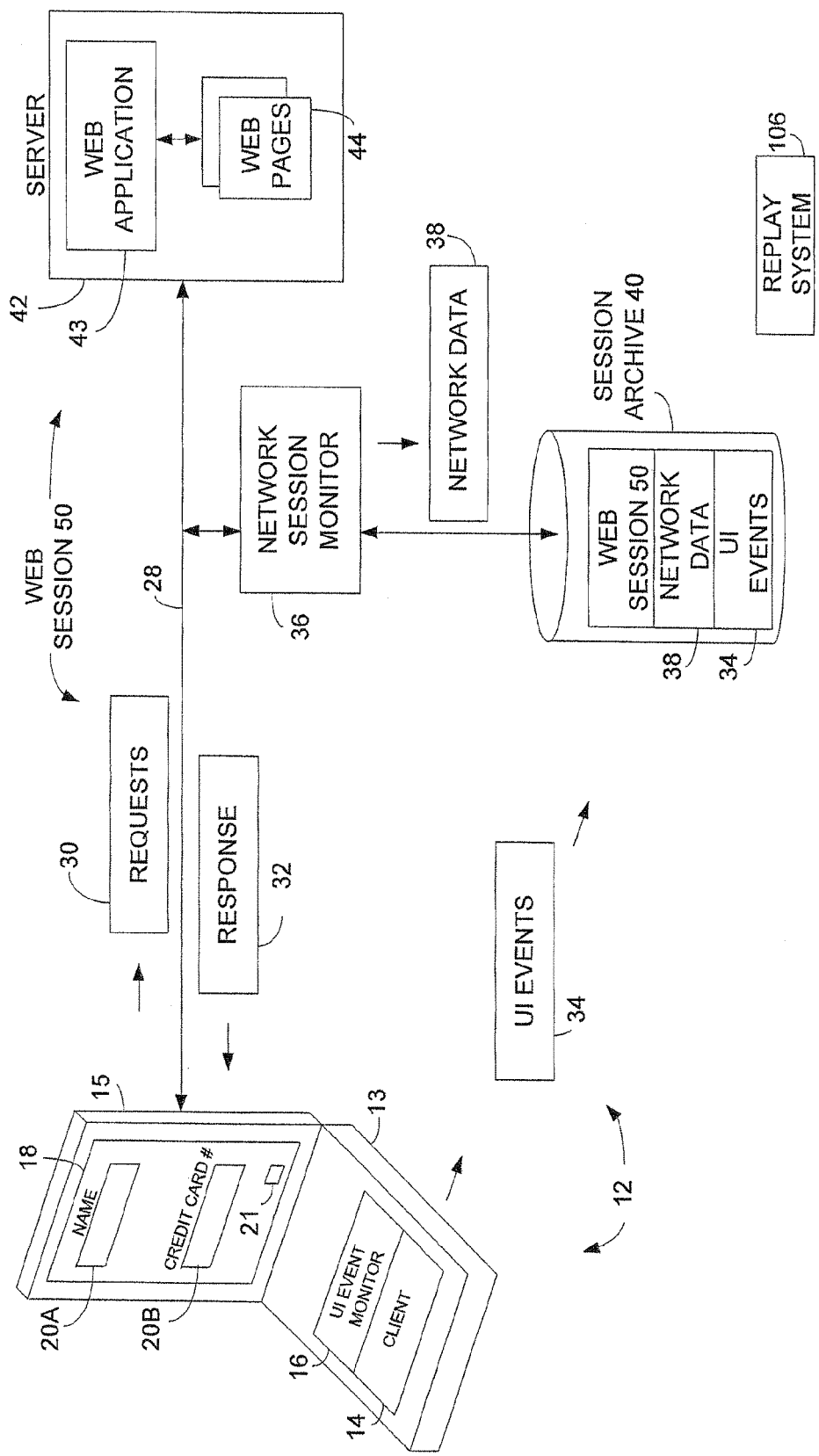
FIG. 1 is a block diagram showing a capture system for monitoring and capturing web sessions.

FIG. 1 shows a capture system 12 used for capturing events during a client web session. A client 14 operating on a computing device 13 establishes a web session 50 with a web application 43 operating on a web server 42. In one embodiment, the client 14 is a web browser. Most of the web sessions conducted over the Internet are stateless in that the network connections are dynamically created and torn down as needed. Therefore, logical web sessions may consist of multiple network sessions.

The capture system 12 can be used with any variety of web sessions, network sessions, or logical user sessions established over a network 28. The capture system 12 can also be used with distributed software applications that do not necessarily operate within a web browser but may periodically send and receive data from an application server that operates on a remote computing system, such as server 42.

The computing device 13 can be any processing system that operates client 14 and accesses or exchanges information with server 42 over network 28. The computing device 13 for example may be a Personal Computer (PC), laptop computer, wireless Personal Digital Assistant (PDA), smart phone, or any other wired or wireless device.

The server 42 is any computing system that operates one or more web applications 43 or application servers that are accessed by different web browser clients 14 or distributed applications. For simplicity, only one client 14 is shown in FIG. 1. However, it should be understood that multiple different clients 14 may exist and be monitored. The web application 43 could be used for conducting any type of web session such as for online purchases or online services. However, these are just examples, and any type of electronic web based transaction or other online activity can be performed using web application 43.

A user of client 14 accesses the web application 43 on server 42. For example, a web browser client 14 may use HyperText Transport Protocol (HTTP) or HTTP over Secure Sockets Layer (SSL) (HTTPS) to communicate with web application 43 over an Internet connection 28. According to different requests 30, the web application 43 sends different responses 32 back to the client 14 that may include different web pages 44, web page logic, or other data used during the web session 50. In this example, a screen 15 on computing device 13 displays a web page 18 provided by the web application 43. The web page 18 includes two fields 20A and 20B that prompt a user to enter a name and credit card number, respectively.

The user enters information into fields 20A and 20B and may then select an "enter button" 21 that causes the information in fields 20A and 20B to be sent back to web application 43 as additional requests 30. The web application 43 may send back other network data, such as responses 32 according to the information contained in requests 30. In this example, the next response 32 from web application 43 may be information confirming the completion of an online transaction that used the information previously entered into fields 20A and 20B. In other instances, the responses 32 can include other web pages 44, or other information responsive to different requests 30.

Client Web Session Monitoring

The capture system 12 includes a network session monitor 36 that captures network data 38 that includes the requests 30 and responses 32 exchanged between the client 14 and web application 43 over the network 28. The capture system 12 may also include a UI event monitor 16 that captures User Interface (UI) events 34 performed on or by client 14 and may include, but is not limited to, events that only occur locally on computing device 13. The UI events can include keyboard character entries, mouse movements, mouse clicks, renderings of the Document Object Model (DOM) for the web page 18, or any other events that happen on computing device 13 during the web session 50. In another embodiment, the network session monitor 36 is not used, and the UI event monitor 16 also captures the network data 38.

Capturing both the network data 38 and UI events 34 for a network/web session 50 allow the capture system 12 to monitor and reproduce network sessions with a higher level of granularity and reproduce and detect events that may not be discoverable with existing network monitoring systems. As a result, the capture system 12 can provide analytics for a wider array of network session events that happen during customer online experiences.

One example of a capture system 12 is described in U.S. patent application Ser. No. 11/616,616, filed on Dec. 11, 2008, entitled: METHOD AND APPARATUS FOR MONITORING AND SYNCHRONIZING USER INTERFACE EVENTS WITH NETWORK DATA which is herein incorporated by reference in its entirety. Another example of a capture system 12 is described in U.S. patent application Ser. No. 12/049,245, filed on Mar. 14, 2008, entitled: REPLAYING CAPTURED NETWORK INTERACTIONS which is also incorporated by reference in its entirety.

The network session monitor 36 may be located anywhere on the network 28 where the network data 38 can be captured for network session 50. In one example, the network session monitor 36 may operate on the same server 42 that operates the web application 43. In another embodiment, the network session monitor 36 could operate on a separate server that might be located within the same enterprise network as server 42. In another embodiment, the network session monitor 36 is located somewhere else in packet switched network 28. In yet another embodiment, as mentioned above, the network session monitor 36 may operate on the same computing device 13 that operates the UI event monitor 16.

Many of the events that happen during the web session 50 may not necessarily be transferred over network 28. Thus, network session monitor 36 may only capture a portion of the information that is required to thoroughly analyze the web session 50. For example, the individual key strokes or cursor selections used for entering information into fields 20A and 20B of web page 18 may never be transferred back over network 28 to the web application.

Alternatively, a batch data transfer of only the completed information from web page 18 may be transferred to web application 43 over network 28. Further, the logic sent along with the web pages 44 may asynchronously change the state of a web page 44 or the state of the web session locally on computing device 13 without ever sending information back over the network 28 to web application 43. This presents a problem when trying to fully analyze the user experience using a previously captured web session 50 that only comprises network data.

User Interface Event Monitoring

The UI event monitor 16 is used in conjunction with the network session monitor 36 to increase the visibility and recreation granularity of online user experiences. The UI event monitor 16 monitors and captures UI events 34 that interact with the network data 38 of the network session 50. The UI event monitor 16, in one example, is a JavaScript application that is downloaded to the browser operated by client 14 via a Hyper Text Markup Language (HTML) tag. Of course, other types of software instructions can also be used for implementing the UI event monitor 16.

The UI event monitor 16 operates autonomously from web application 43 and detects certain UI events 34 associated with particular web sessions 50 established between the client 14 and web application 43. By operating locally on computing device 13, the UI event monitor 16 can detect events caused by client 14 on web page 18. For example, the UI event monitor 16 can detect characters entered into the fields 20A and 20B in web page 18. The UI event monitor 16 can also detect when a user selects different elements in the web page 18; or selects fields in the web page that cause other web pages to be displayed, connect to other web links, or that generally change the state of the web session 50. Some of these UI events 34, or sequence of events, might only be detectable locally on computing device 13 and never transferred over network 28.

The UI events 34 associated with the web session 50 are captured by the UI event monitor 16 and then automatically transferred to a session archive 40. Similarly, the network session monitor 36 sends the captured network data 38 for the web session 50 to the same session archive 40. A replay system 106 is then used to analyze the captured network data 38 and the captured UI events 34 for the captured network session 50.

The capture system 12 provides the unique combination of capturing both network data 38 exchanged between client 14 and web application 43 during the web session 50 and also capturing the local UI events 34 on the computing device 13. Based on what analytics need to be preformed, the captured network data 38 and captured UI events 34 may be analyzed separately, in combination, or synchronized together to virtually replay the previous web session 50.

Missed Web Session Events

The capture system 12 may not be able to capture some events from the web session 50. Web page logic, such as JavaScript code or other AJAX code may operate in conjunction with the web page 18 and prevent the UI event monitor 16 from detecting or capturing some of the UT events 34. For example, the web page logic may not bubble particular UI events 34 up to a parent element that the event monitor 16 uses for monitoring the web session 50. In another situation, the capture system 12 may inadvertently miss certain events from the web session 50. In another situation, the web page logic may disable some of the event listeners used by the UI event monitor 16 for capturing the UI events 34.

Non-captured events can prevent accurate replay of the web session 50. For example, the client 14 when conducting a web session 50 with web application 43 may sequence through a series of events that select different fields on a web page and enter data into the selected fields. The web application may not be able to move to a next state of the web session unless all of these events are entered. If all of these web events are not captured by the capture system 12, the replay system 106 might not be able to sequence through the previously captured web session 50. This could result in the replay session identifying or experiencing failures that never actually happened during the client web session 50.

Figure 2:
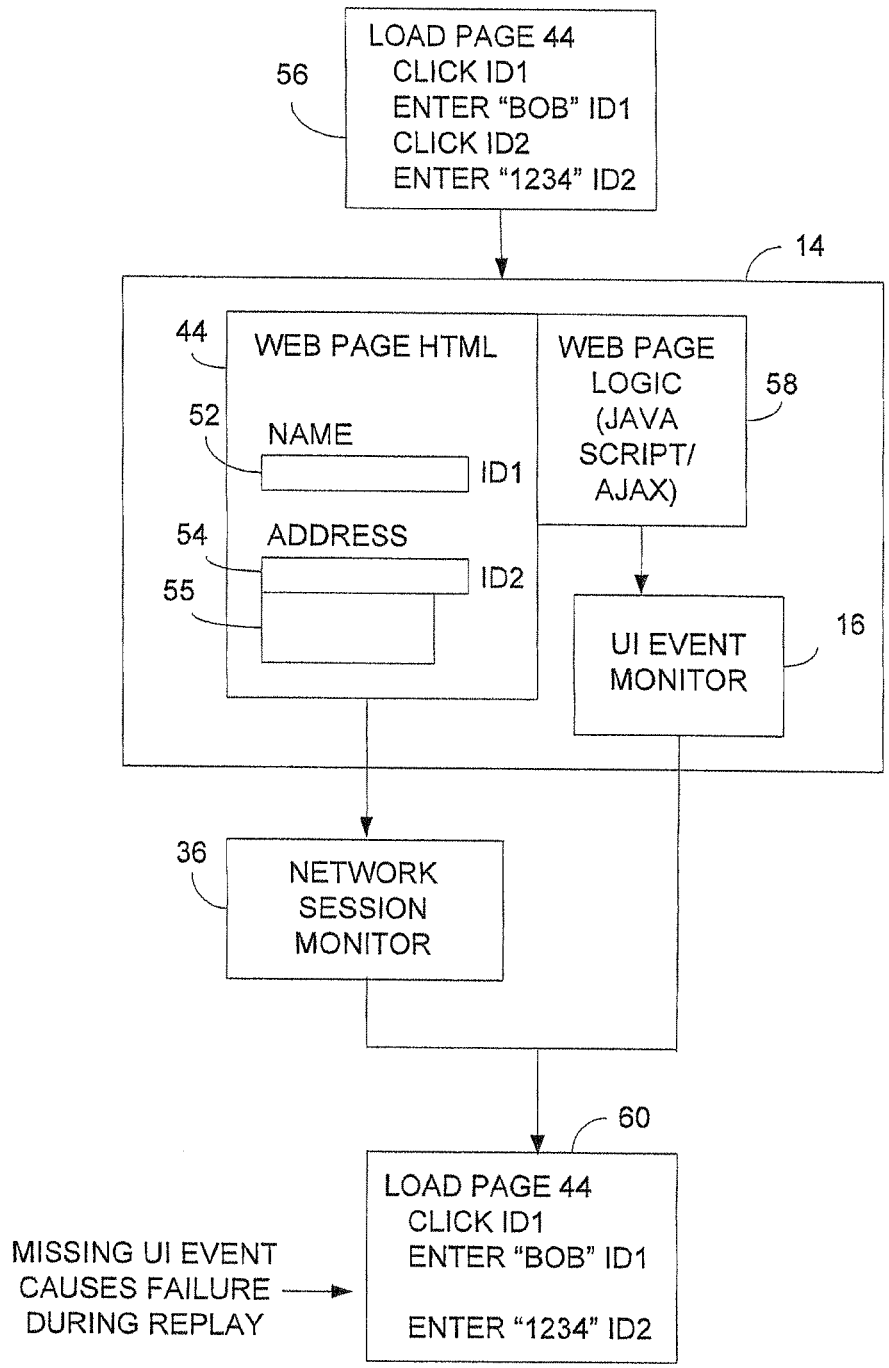
FIG. 2 is a block diagram showing how web page logic can prevent the capture system in FIG. 1 from capturing certain web session events.

Referring to FIGS. 1 and 2, a series of events 56 occur during a user web session. The web application 43 on server 42 in FIG. 1 first downloads the web page 44 to the client 14 on computing device 13. A user then performs a series of additional UI events 56 within the web page 44. The network session monitor 36 and/or the UI event monitor 16 attempt to capture and store the web page 44 and other associated events 56 in the session archive 40 in FIG. 1. The replay system 106 then replays the captured events 56 in a subsequent replay session.

The web page 44 includes a first NAME field 52 referenced as ID1 and an ADDRESS field 54 referenced as ID2. The web page 44 is downloaded from the web application 43 with web page logic 58 such as JavaScript or AJAX. The web page logic 58 may perform different functions based on the information entered into fields 52 and 54. For example, the web page logic 58 may call the web application 43 to download additional zip code information that fills in an additional drop down menu 55 in web page 44 based on the address information entered into address field 54.

In this example, after the web page 44 is downloaded and rendered on computing device 13, a user moves a cursor into field 52, clicks a mouse button to select the field 52, and then enters the name "BOB". The user then moves the cursor into field 54, clicks the mouse button to select field 54, and then enters the address "1234." These series of events 56 correspond to the following UI events:

LOAD PAGE 44
CLICK ID1
ENTER "BOB" ID1
CLICK ID2
ENTER "1234" ID2

The web page logic 58 may prevent the UI event monitor 16 from capturing all of the UI events 56 entered into web page 44. For example, the web page logic 58 may cancel, hide, and/or "not bubble up" some events to a parent HTML element. This parent element may be used by the UI event monitor 16 for capturing at least some of the UI events 56. In this example, the web page logic 58 prevents the UI event monitor 16 from capturing the UI event associated with a user selecting field 54 (CLICK ID2).

Missed selection of a field can cause a subsequent replay session to fail. For example, assume that initially the ADDRESS input element does not exist. The page 14 may have logic 58 that creates this ADDRESS element only after the user clicks on a checkbox. If the user click is missing then subsequent replay cannot proceed.

Detection and Inference System

Figure 3:
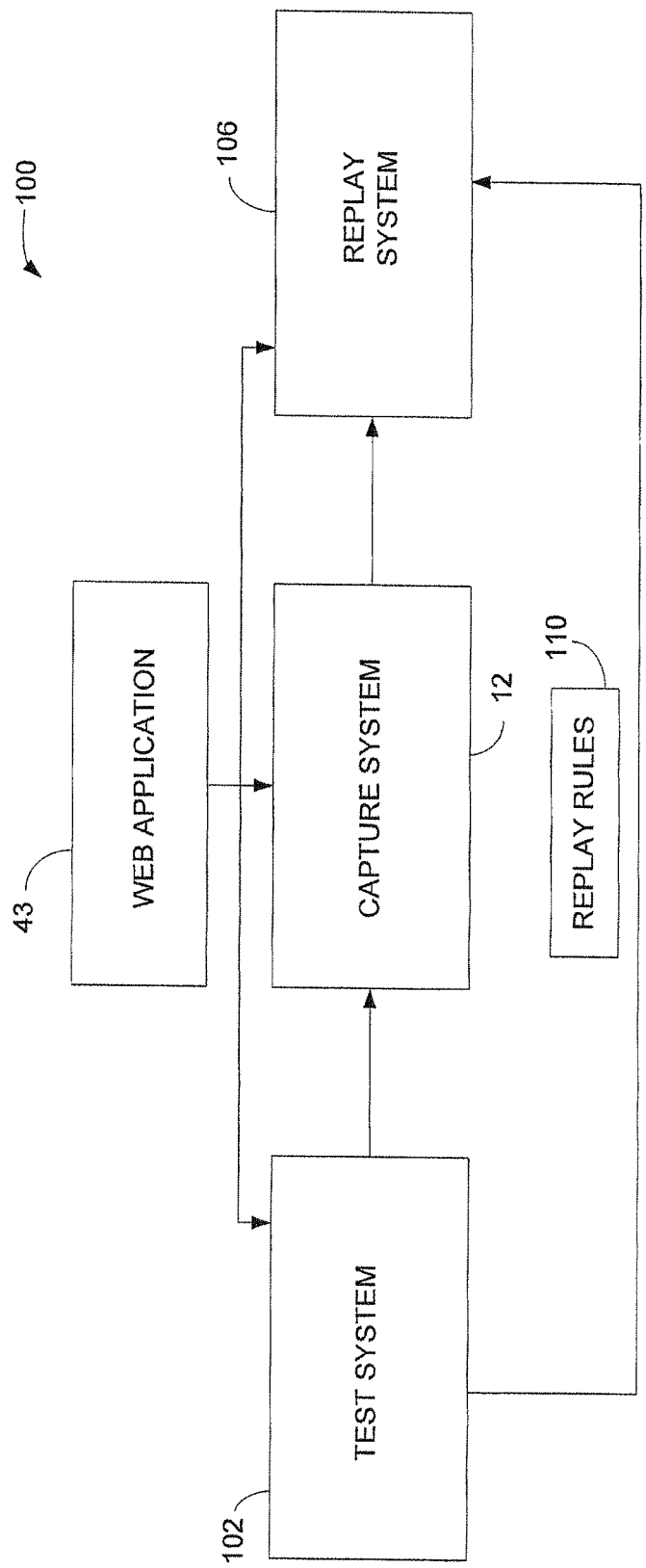
FIG. 3 is a block diagram of a system that identifies and makes inferences about events that were missed by the capture system of FIG. 1.

FIG. 3 shows an event detection and inference system 100 that identifies web session events that are not captured by the capture system 12. The system 100 can also generate replay rules 110 that make inferences regarding events that likely happened during the web session but that were missed by the capture system 12. The replay rules 110 are used during a replay session of a previously captured web session to generate or "infer" the missed events. These replay rules move the replay session back into the next state that should have occurred during the actual client web session 50. These inferences allow the replay session to successfully continue through the captured web session and more accurately simulate the actual user web session experience with more granularity.

The system 100 can also be used to identify events that need to be captured by the capture system 12 and immaterial events that do not necessarily need to be captured by the capture system 12. For example, some web session events may not change the Document Object Model (DOM) of a web page 44 and therefore may not provide useful information during a replay session. Identifying these immaterial events allow the UI event monitor 16 to more intelligently capture only the data that is important to the client web session experience. Because the capture system 12 uses less memory and processing resources, it is less likely to slow down the monitored web session.

A test system 102 identifies the web session events that are missed by the capture system 12 and generates replay rules 110 when necessary. The missed events identified by the test system 102 can be used as feedback for modifying the capture system 12 and/or web application 43. For example, some missed events might be captured if modifications are made to the code in capture system 12 or modifications are made to the code in web application 43. In these cases, the test system 102 provides automated feedback that indicates how effectively the capture system 12 captures web sessions 50.

Some events might not be captured regardless of what modifications are made to the code in capture system 12. It also might not be practical to modify the web application 43 or capture system 12 for every situation where a particular web session event is not captured. In these cases, the test system 102 can either manually or automatically generate replay rules 110 that can infer and simulate the missed web session events.

The replay system 106 uses the replay rules 110 generated by the test system 102 when replaying a previously captured web session to make inferences about events that likely happened but were not actually captured by the capture system 12. This allows the replay system 106 to more accurately replay captured web sessions that could have otherwise failed or moved into an undefined state due to the missed events.

Test System

Figure 4:
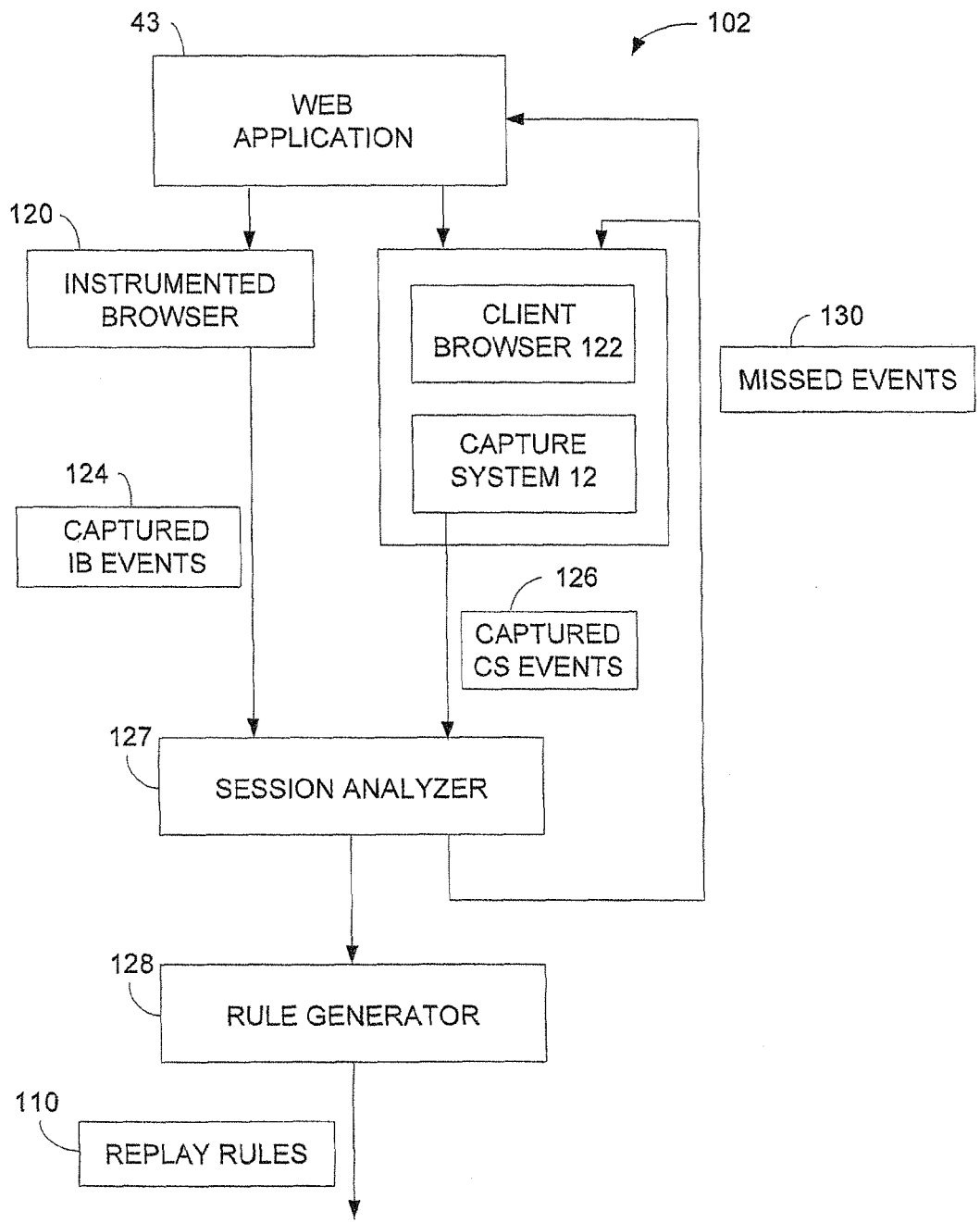
FIG. 4 shows a test system of FIG. 3 in more detail.

FIG. 4 shows the test system 102 of FIG. 3 in more detail. An instrumented browser 120 is used for analyzing a web session. An instrumented browser refers to a web browser that operates with code specifically designed to capture web session events that might not normally be observable by the UI event monitor 16 or network session monitor 36 used in the capture system 12 in FIG. 1. Instrumentation can be achieved in various forms such as: direct modification (i.e. embedded test/debug source code); browser plugin/extension; and/or a script library/toolkit that is dynamically included at run-time which has advanced/debugging capability compared to the regular capture JavaScript. The instrumented browser 120 can also observe complete network activity that may not be available to the network session monitor 36.

Because the instrumented browser 120 operates in a test mode, it would typically not be usable as a commercial version of client web browser 122. For example, the instrumented browser 120 generates large amounts of test data that would slow down normal client web sessions.

Figure 5:
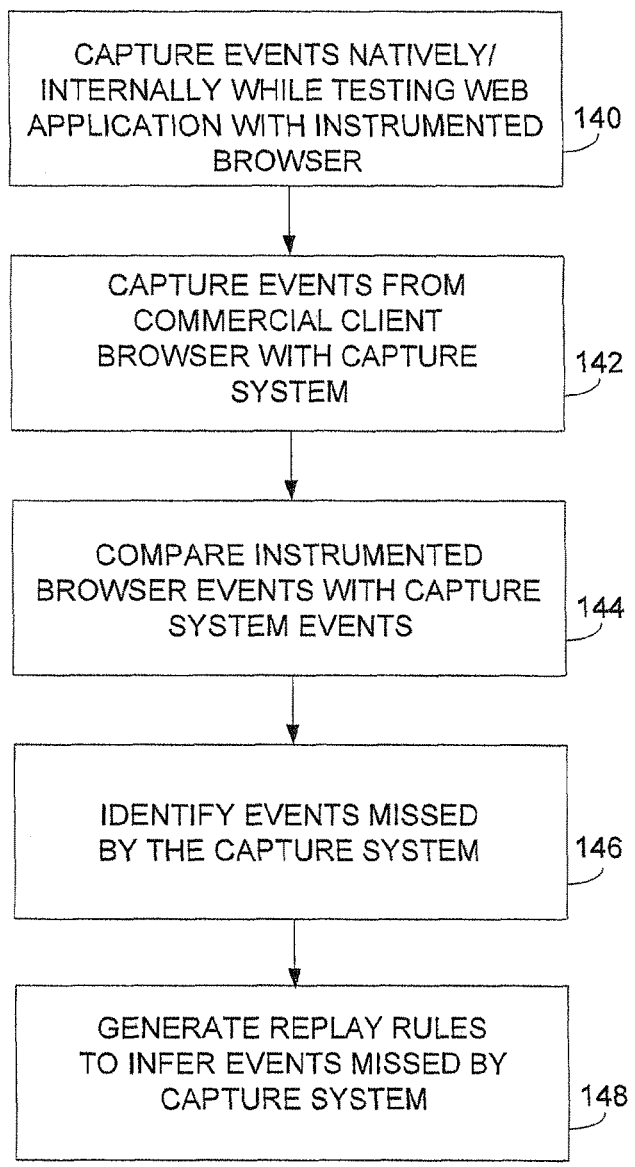
FIG. 5 is a flow diagram explaining how the test system of FIG. 4 identifies missed web session events.

Referring to both FIGS. 4 and 5, the instrumented browser 120 in operation 140 conducts a test web session with the web application 43. A predetermined set of user inputs may be used during the test web session. The instrumented browser 120 captures substantially all of the web session events 124, or at least the events of interest, that happened during the web session with web application 43. As mentioned above, the instrumented browser 120 can also capture events 124 and other state information that might not be observable by a program, such as UI event monitor 16, that can only externally monitor the events associated with a client web browser 122.

In operation 142, the capture system 12 captures events 126 from a client web session with web application 43. The capture system 12 uses a commercial client version of the web browser 122 that does not include the test code contained in, or used with, instrumented browser 120. The same web session is conducted in both instrumented browser 120 and non-instrumented client browser 122 by entering the same sequence of predetermined user inputs. The Capture System (CS) events 126 represent the events that would have been captured and archived by the capture system 12 during a normal client web session 50 with web application 43.

In operation 144, a session analyzer 127 in FIG. 4 compares the captured IB events 124 from the instrumented browser 120 with the captured CS events 126 from the capture system 12. Since the instrumented browser 120 can view the web session from "the inside", the IB events 124 are used as reference events for the captured CS events 126. Any differences between the captured IB events 124 and captured CS 126 are either manually or automatically identified by the session analyzer 127 in operation 146 as missed events 130.

For example, the session analyzer 127 may identify an IB event 124 that enters data into a particular field of a downloaded web page. The session analyzer 127 searches through the CS events 126 for the same event entered into the same web page. The session analyzer 127 may also compare the two web pages to determine if both web sessions are in the same state. For example, the Document Object Models (DOMs) for the downloaded web pages captured by instrumented browser 120 and capture system 12 can be compared and any differences detected. Comparison of DOMs is discussed in more detail below.

Any missed events or inconsistent states 130 between IB events 124 and CS events 126 are identified by the session analyzer 127 in operation 146. The missed events can be used as feedback for the capture system 12 and/or web application 43. For example, the capture system 12 can be analyzed to determine if the missed events 130 are due to problems with the code or configuration in the UI event monitor 16 or network session monitor 36. If possible, code or configuration in the capture system 12 is modified to capture the missed events 130.

In another situation, the web pages of the web application 43 may be poorly designed and prevent the capture system 12 from capturing particular events. If not cumbersome, the web application 43 can be modified to allow the capture system 12 to capture the missed events 130. For example, the web page logic 58 in FIG. 2 may inadvertently generate exceptions or unnecessarily generate internal data that slow down web sessions. The missed events 130 in FIG. 4 may be associated with these exceptions and highlight inefficient or erroneous code in the web application 43.

In some situations, it may not make sense to modify the code in either the web application 43 or the code in the capture system 12. For example, the code in the web application 43 may currently follow best coding practices and modifying the web application just to enable capture of a particular web session event would be impractical.

In these situations, the test system 102 in operation 148 uses a rule generator 128 in FIG. 4 to either manually or automatically generate replay rules 110. As mentioned above, the replay rules 110 are used by the replay system 106 in FIG. 3 to make inferences about events that happened during the client web session 50 but were not actually captured by the capture system 12.

Figure 6:
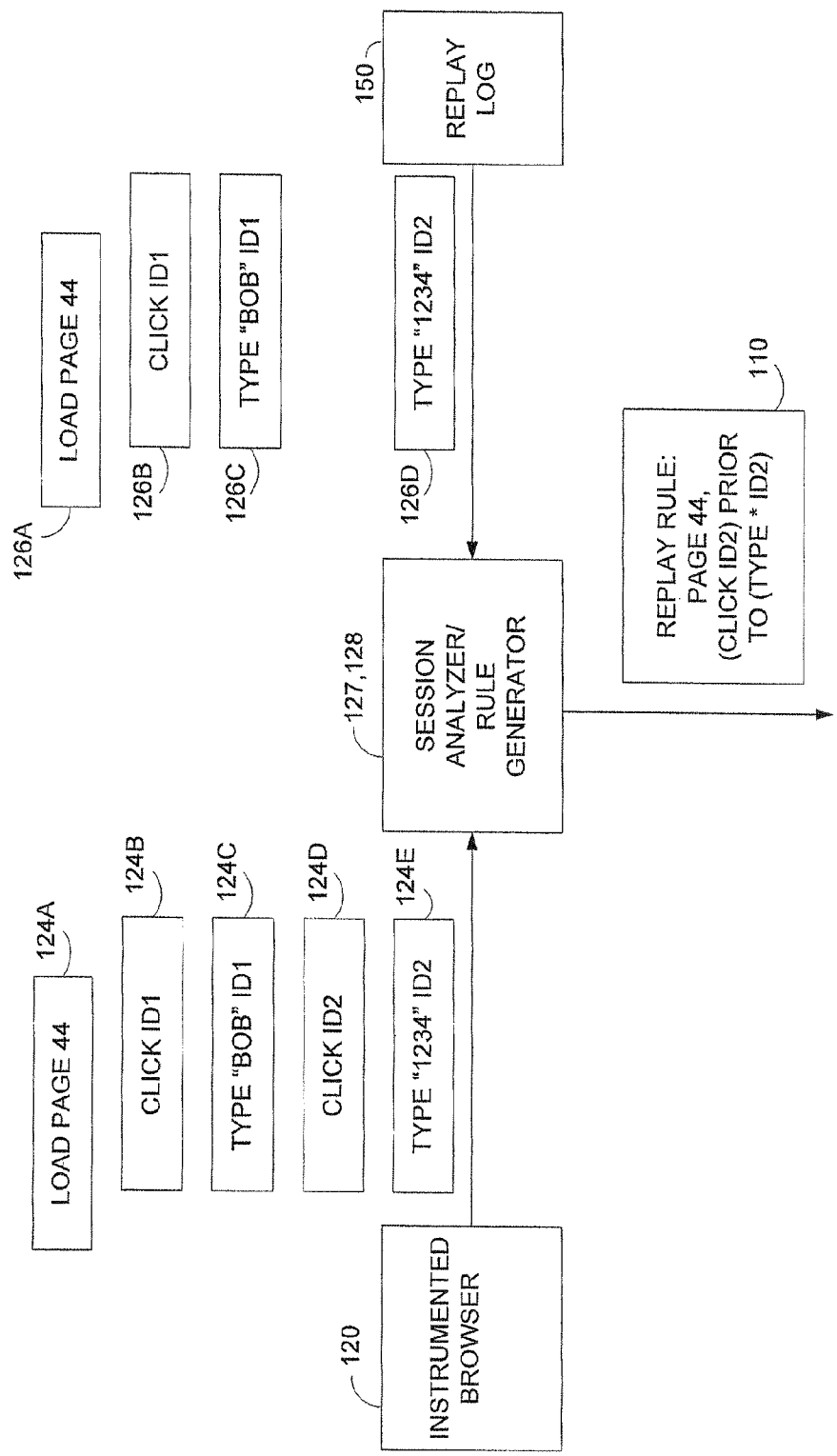
FIG. 6 is a block diagram showing in more detail how the test system of FIG. 4 generates replay rules.

FIG. 6 shows one example of how the rule generator 128 in FIG. 4 generates a replay rule 110 from one of the missed events 130. The instrumented browser 120 captures the events 124A-124E from a test web session. A replay log 150 contains the events 126A-126D for the test web session conducted on client browser 122 and captured by the capture system 12. The events 124 and 126 are compared in the order captured. For example, the instrumented browser 120 and capture system 12 can assign time stamps or reference values to the events that are used by the session analyzer 127 to analyze the events 124 and 126, respectively, in a same sequence.

The session analyzer 127 identifies the load page 44 event 124A and 126A from the instrumented browser 120 and replay log 150, respectively. The sequence of UI events 124B and 124C are identified from the instrumented browser 120 and the same sequence of events 126B and 126C are identified from the replay log 150. These events correspond to a user selecting field 52 in the web page 44 in FIG. 2 and entering the characters "BOB".

The session analyzer 127 next receives the events 124D and 124E from instrumented browser 120. These events correspond with a user selecting the second field 54 in web page 44 in FIG. 2 and entering the characters "1234", respectively. However, the session analyzer 127 receives the event 126D from replay log 150 that enters the characters "1234" into field 54 but fails to receive an equivalent preceding event 124D that selected field 54. From these comparisons, the session analyzer 127 determines that the capture system 12 failed to capture the event (CLICK ID2) where the user selects address field 54 in FIG. 2 prior to entering data "1234" into address field 54.

In this example, the rule generator 128 generates a replay rule 110 to infer the missed event 124D. The rule generator 128 determines that field ID2 was not selected (CLICK ID2) before data can be into field ID2. This can be determined by identifying missed event 124D as preceding event 124E and/or by general logic in the rule generator 128 that determines that fields need to be selected prior to entering data. Accordingly, rule generator 128 generates replay rule 110 that selects field ID2 (CLICK ID2) in page 44 in FIG. 2 prior to any data being entered into that same field 54 (TYPE "*" ID2).

Replay System

Figure 7:
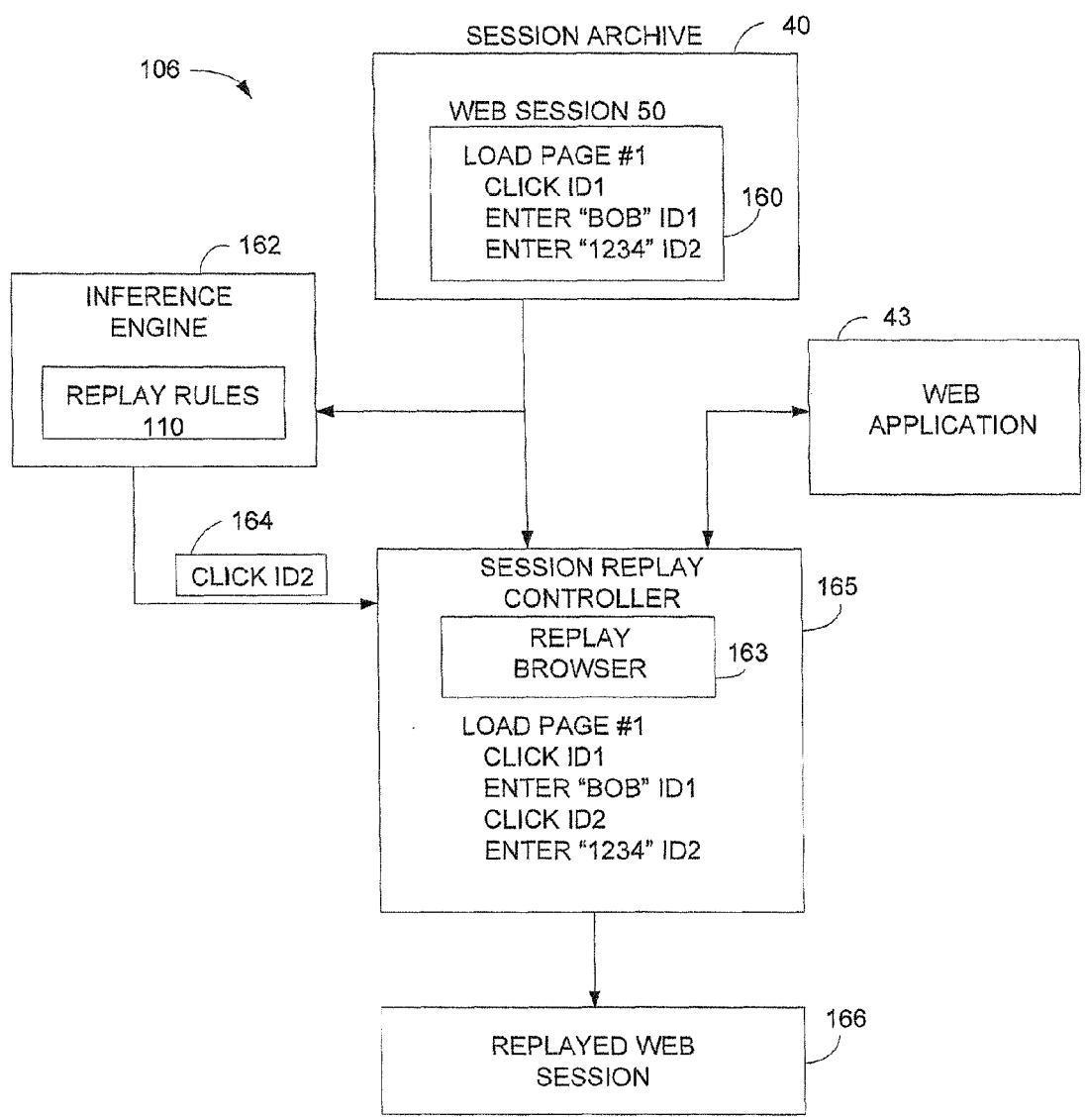
FIG. 7 is a block diagram showing a replay system of FIG. 3 in more detail.

FIG. 7 shows the replay system 106 of FIG. 3 in more detail. The replay system accesses the session archive 40 previously shown in FIG. 1 that contains the web session events 160 previously captured by the client system 12 from actual client web session 50. An inference engine 162 uses the replay rules 110 generated by the test system 102 when replaying a captured web session 50.

A session replay controller 165 contains software for replaying the web session 50 previously captured by the capture system 12. The session replay controller 165 may include a replay browser 163 similar to the commercially available client browser 16 (FIG. 1) used by clients during web session 50. The replay browser 163 could also be a modified version of a client web browser that works in combination with other analytic software in the session replay controller 165. For example, the session replay controller 165 may also include additional display and analytic features that are used in conjunction with the replay browser 163 to highlight, synchronize, and step through the individual web pages and UI events from the previously captured web sessions. In another embodiment, the session replay controller 165 may comprise or use a conventional client web browser for replay browser 163.

A few example embodiments of session replay controllers have been described in co-pending U.S. patent application Ser. No. 11/616,616; and U.S. patent application Ser. No. 12/049,245, which have both been incorporated by reference.

The web application 43 may be the same application accessed during the previously captured web session 50. Alternatively, the capture system 12 might have captured enough events 160 and information from the web session 50 so the replay session does not need to reference web application 43.

Figure 8:
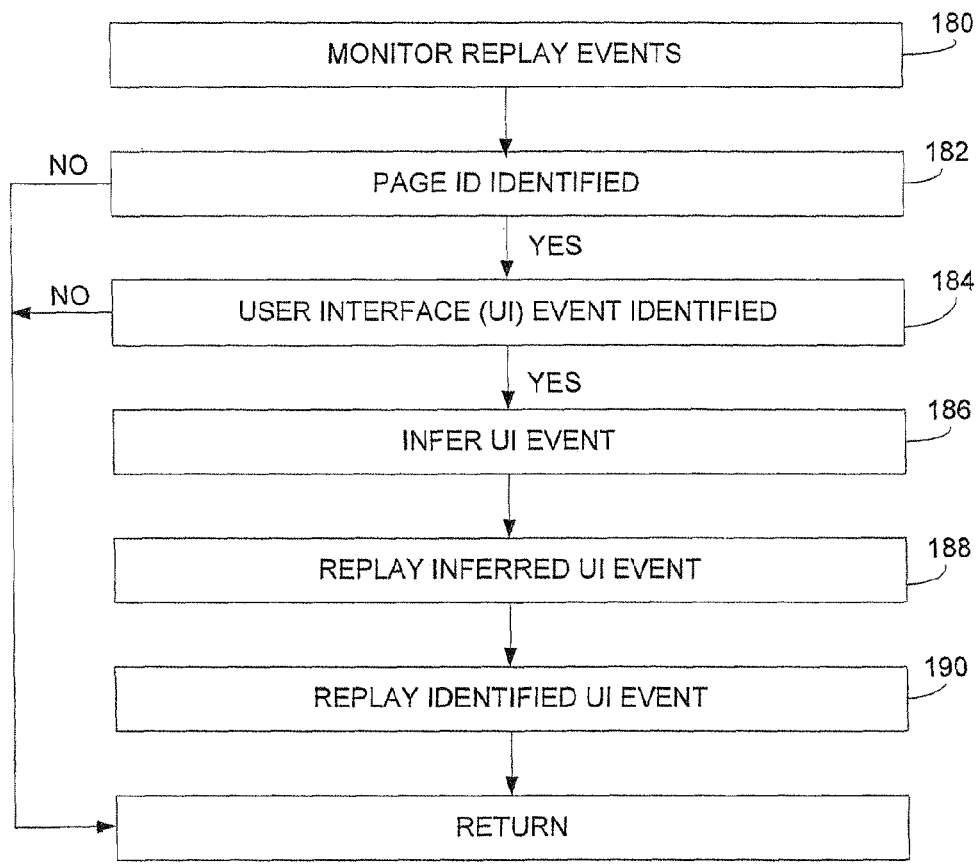
FIG. 8 is a flow diagram explaining how the replay system in FIG. 7 uses replay rules during a replay session

Referring to FIGS. 6-8, the inference engine 162 in operation 180 monitors the captured events 160 replayed in the session replay controller 165. The inference engine 162 contains the replay rule 110 that corresponds to the missing mouse click into field 54 of page 44 (CLICK ID2). The inference engine 162 in operation 182 looks for the web page 44 identified in the replay rule 110. If the loaded web page does not correspond with the replay rule 110, the inference engine 162 returns and waits for the next loaded webpage for the replay session.

If the web page identifier corresponds to replay rule 110 (page 44), the inference engine 162 in operation 184 monitors the events corresponding with the identified web page. In this example, the UI event associated with replay rule 110 looks for any data entered into field ID2 (TYPE * ID2). If the UI event is not detected in operation 184, the inference engine 162 returns to operation 180 and continues to monitor the other events associated with web page 44.

If the UI event (TYPE * ID2) is detected in operation 184, the inference engine 162 has detected the web state that corresponds with replay rule 110. The inference engine 162 infers that the identified UI event (TYPE * ID2) was preceded by a mouse selection of field ID2 (CLICK ID2). Accordingly, the inference engine 162 replays the inferred UI event 164 (CLICK ID2) in operation 188 prior to replaying the captured UI event (ENTER "1234" ID2) in operation 190.

The order that inferred events 164 and captured events 160 are replayed in session replay controller 165 depends on the corresponding capture rule 110 and captured web session states. The inferred events 164 can correspond to any captured event 160 including captured network data 38 or captured UI events 34 in FIG. 1. The inferred events 164 may also be triggered on some other event or information associated with the web session 50. For example, inferred events 164 may be generated based on a period of time after a particular event was captured or not captured, or could be based on other web page state information. For example, inferred events 162 are also inferred based on Document Object Models (DOMs) for the web pages as discussed below.

Replay Rules for Inferred Events, Actions and States

Figure 9:
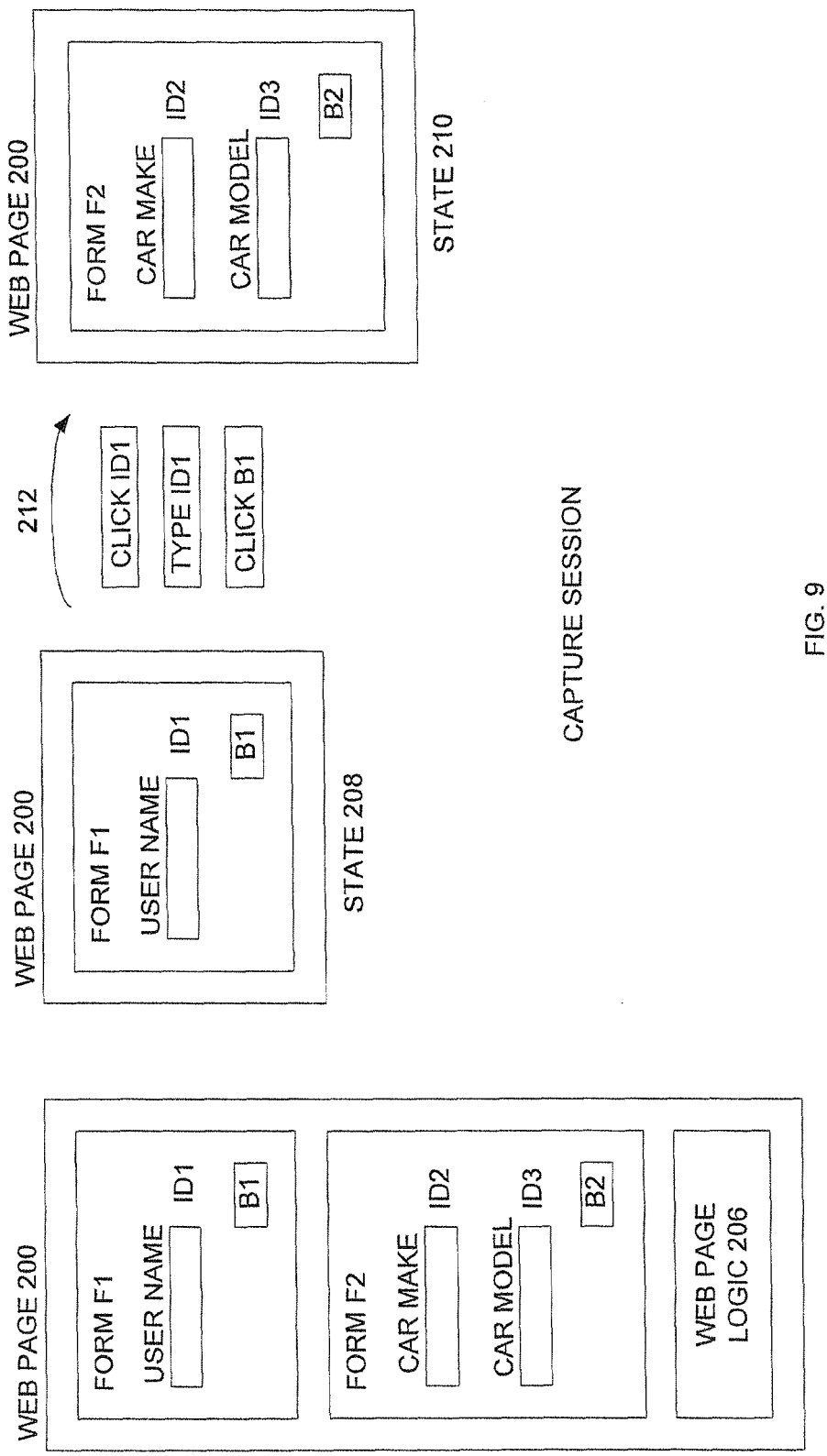
FIGS. 9 and 10 show another example of how a replay session may not accurately replay a previously captured web session.

Even if all of the UI events 34 are successfully captured by capture system 12, the replay system 106 still may not correctly sequence through all of the states of the previously captured web session 50. The test system 102 can infer events, actions or web states that may not normally be reproducible during a web replay session. FIG. 9 explains these other inferred events in more detail.

FIG. 9 shows a web page 200 that contains two different forms F1 and F2. The first form F1 contains a field ID1 for entering a user name and a button field B1 that is selected indicating a user has finished entering data into field ID1 and form F1 is completed. The second form F2 includes a field ID2 for entering a make of car, a field ID3 for entering a car model, and a button field B2 for indicating form F2 has been completed. The web page 200 is loaded from the web application 43 in FIG. 1 into the client browser 14 in FIG. 1 along with web page logic 206.

In a first web page state 208, the web page logic 206 associated with web page 200 may initially only display form F1. During the web session the user may enter UI events 212 into web page 200 that select field ID1 (CLICK ID1), type data into the selected field ID1 (TYPE ID1), and select button field B1 (CLICK B1). After entering data into field ID1 and clicking on the button field B1, the web page logic 206 may move into a second state 210 where the visibility of form F1 is turned off and the visibility of form F2 is turned on.

Figure 10:
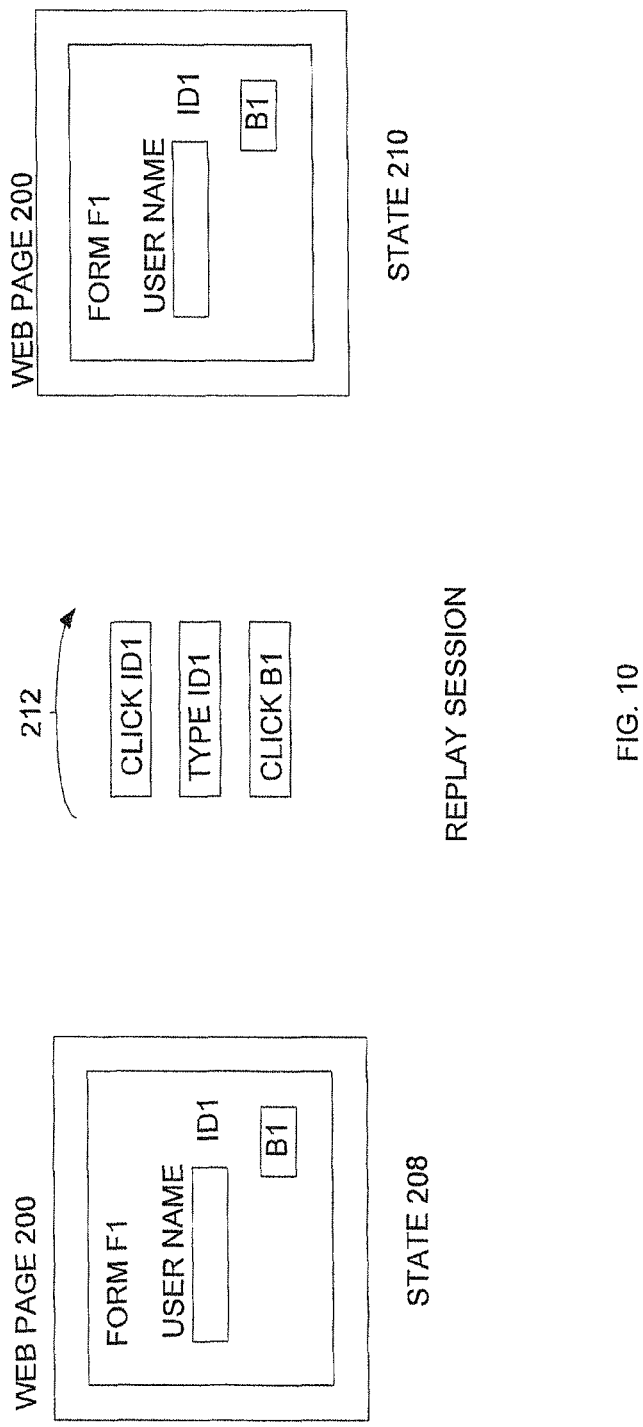

FIG. 10 shows a replay session where the capture system 12 in FIG. 1 successfully captures both the web page 200 and the UI events 212 but cannot reproduce web page state 210. During replay, the web page 200 is displayed in state 208 where only the visibility of form F1 is turned on. The replay system may replay the successfully captured events 212. For example, the replay session replays the CLICK ID1 event that selects field ID1, the TYPE ID1 event that enters data into the selected field ID1, and the CLICK B1 event that selects the button field B1. However, during the replay session web page 200 stays in state 208 and never moves into state 210 where the visibility of form F1 is turned off and the visibility of form F2 is turned on. In other words, the replay session never moves from state 208 to state 210.

This could be due to many different reasons. For example, the web page logic 206 in FIG. 9 might require multiple different events to occur, in addition to the selection of button field B1, before transitioning from state 208 to state 210. Some of these events might not have been captured by the capture system 12. For example, the web page logic 206 may have to successfully communicate and receive data back from the web application 43 (FIG. 1) prior to transitioning into state 210.

The capture system 12 may not be able to, or may not want to, capture these communication and data messages between web page logic 206 and the web application 43. Further, the replay system 106 in FIG. 3 may not even use the web page logic 206 during a replay session. Thus, the replay session might not be able to transition from state 208 to state 210 simply by replaying user interface events 212.

Figure 11:
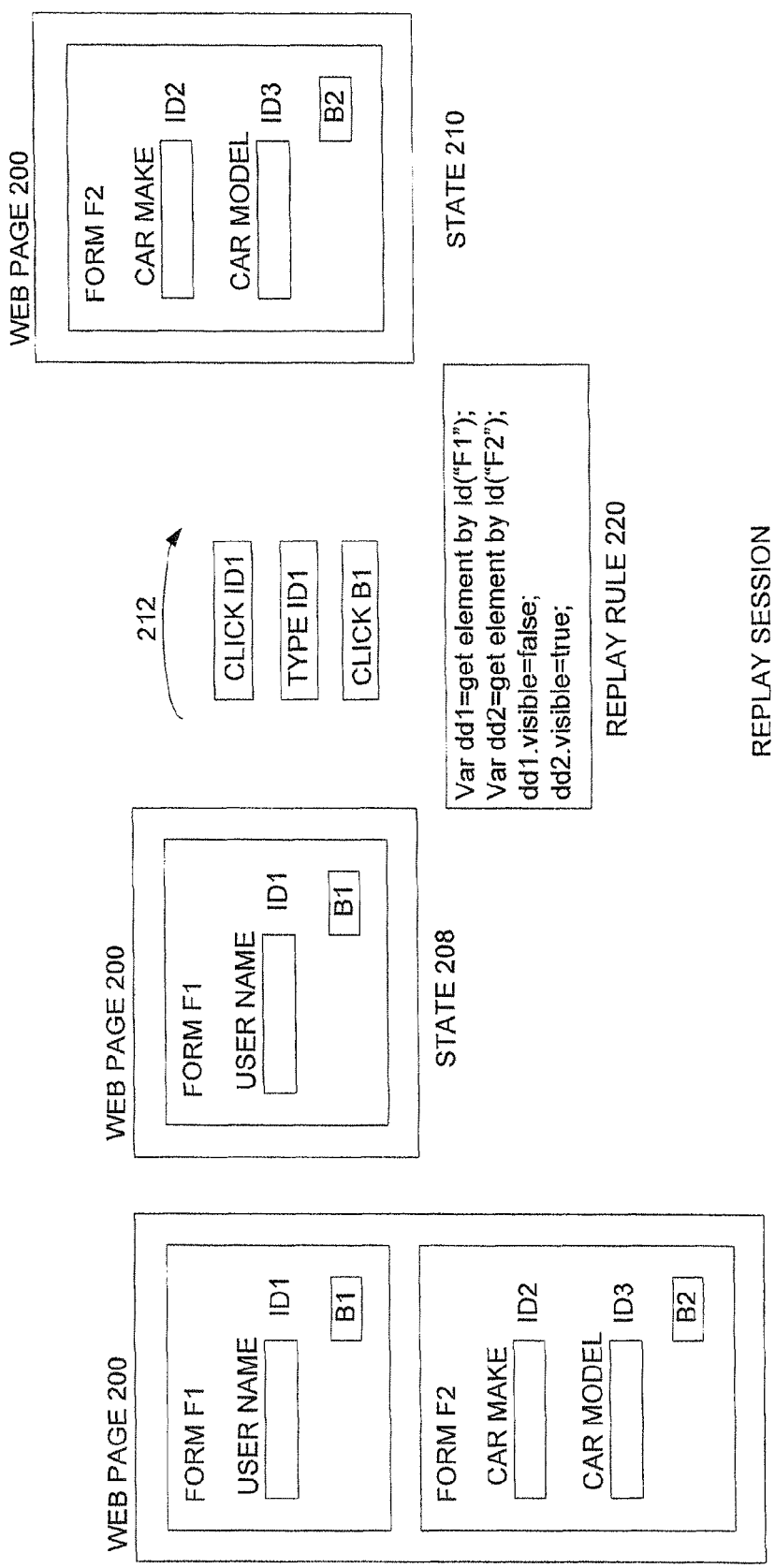
FIG. 11 shows how a replay rule can change a Document Object Model (DOM) state during a replay session.
Figure 12:
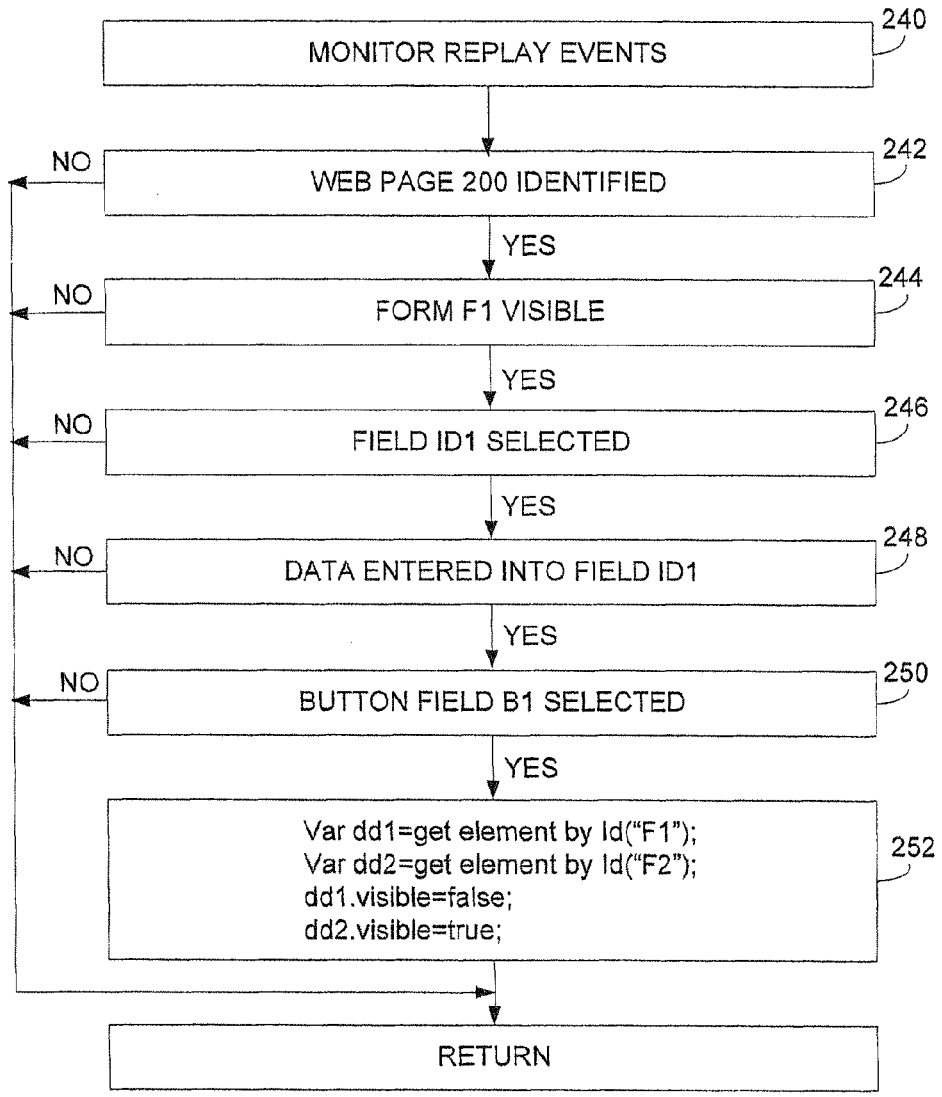
FIG. 12 is a flow diagram showing how the replay rule in FIG. 11 is used during a replay session.

FIGS. 11 and 12 show how the test system 102 in FIG. 4 either manually or automatically generates a custom highlighting replay rule 220 that forces the relayed web session to transition from state 208 to state 210. During a replay session, the replay rule 220 in operation 240 causes the inference engine 162 in FIG. 7 to monitor the captured replay events 212. The inference engine 162 in operation 242 first looks for the web page 200 associated with state 208. If the web page 200 is identified, the inference engine 162 (FIG. 7) in operation 244 next determines if form F1 is visible.

If form F1 is visible, the inference engine 162 in operation 246 looks for a next UI event 212 that selects field ID1. If field ID1 is selected, the inference engine 162 in operation 248 looks for a next UI event 212 that enters data into field ID1. If data is entered into field ID1, the inference engine 162 in operation 250 looks for a next UI event 212 that selects button field B1. Some or all of events 212 may not necessarily have to happen in any particular order, but are shown in the order of FIG. 12 for illustrative purposes. Further, fewer or more events 212 may be identified in the replay rule 220 for triggering the change from state 208 to state 210.

In this example, when the group of events 212 are all detected during the replay session, the inference engine 162 infers that the web page logic 206 in FIG. 9 turned off the visibility of form F1 and turned on the visibility of form F2. Accordingly, the inference engine 162 in operation 252 forces a DOM change that turns off the visibility of form F1 and turns on the visibility of form F2. This moves the web page 200 into the correct next state 210 so that the replay system 106 can continue the replay session.

Analyzing Web Sessions with Document Object Models

A Document Object Model (DOM) refers to the web browser rendering of an HTML web page into binary data. The DOM represents the current state of a web page at any given moment. For example, a web page and corresponding DOM may be in a first state 1. A user may enter some data into the web page that automatically updates the DOM into a second state 2. Web page logic may then provide additional operations pursuant to entered user data that automatically updates the DOM into a third state 3. The test system 102 uses the DOMs to identify significant web session events, missed web session events, and as described above generate replay rules.

Figure 13:
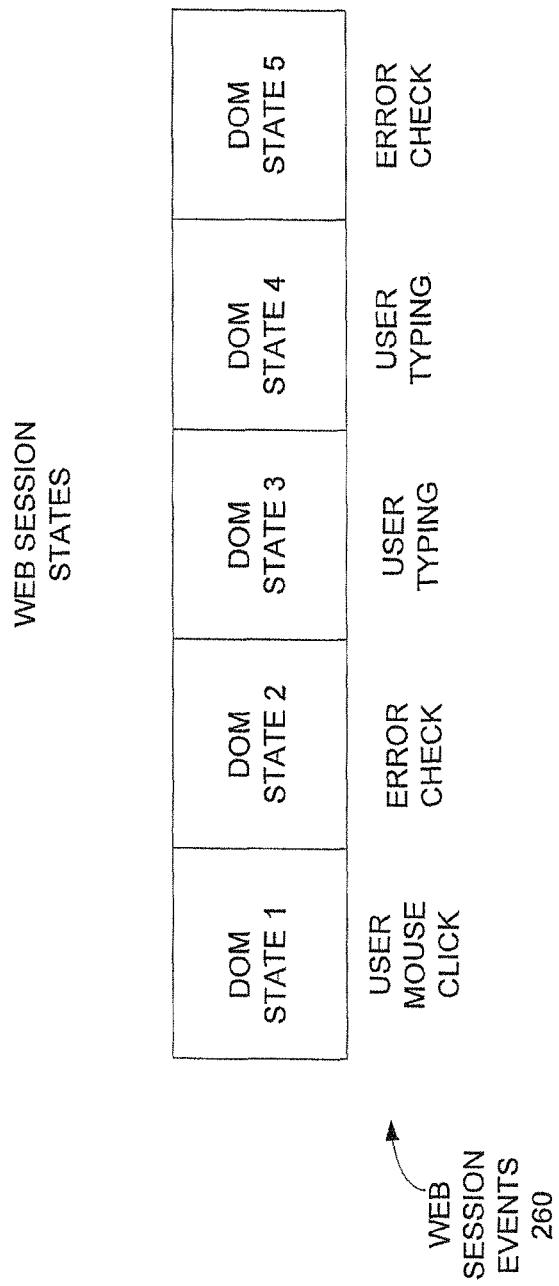
FIG. 13 is a block diagram showing different DOM states for a web session.

To explain further, FIG. 13 shows a series of DOM state changes 1-5 that correspond to different web session events 260. The first DOM state 1 occurs after a user mouse click that selects a field in a currently displayed web page. A second DOM state change 2 happens when web page logic in the web page exchanges error check messages with the web application 43 in FIG. 1. The DOM states 3 and 4 correspond with a user typing data into the previously selected field in the currently displayed web page. A fourth DOM state 5 happens when the web page logic exchanges another error check with the web application 43.

The DOM states 1, 3, and 5 change how the web page is displayed to a user. For example, the user mouse click event associated with DOM state 1 causes a cursor to be displayed in the selected field. The typing events in DOM states 3 and 4 cause characters to be displayed in the selected field. On the other hand, the error checking operations corresponding to DOM states 2 and 5 do not change how to the web page is currently being displayed to a user. For example, the error checking messages associated with DOM states 2 and 5 may simply confirm a current connection between the client browser 14 and the web application 43 is still valid. If the connection is valid, some parameters in DOM states 2 and 5 may change or be updated, but the user will not see these changes on the displayed web page.

Either manually or automatically, the test system 102 compares the DOM state changes 1-5 to determine which events are significant for the replay session. For example, DOM state 1 can be compared to DOM state 2. If the difference between DOM 1 and DOM 2 does not change how the web page is displayed to a user, the test system 102 may not want to include the associated event 260 in an event list 280 shown below in FIG. 15. The event list 280 is used by the capture system 12 to determine what events to capture during a replay session. The event list 280 can also identify which DOM changes to capture for a currently displayed web page. Since the change from DOM state 1 to DOM state 2 does not materially change how the web page is displayed to a user, the test system 102 may not add the associated event (ERROR CHECK) to the event list 280.

Comparing DOM state changes allows the capture system 12 to more efficiently capture client web sessions 50. For example, the capture system 12 can use the event list 280 to only capture the events and data that are significant in the user web session experience. Because less client web session data is captured and fewer processing resources are used, the capture system 12 is less likely to slow down the processing device 13 while monitoring a client web session.

Figure 14:
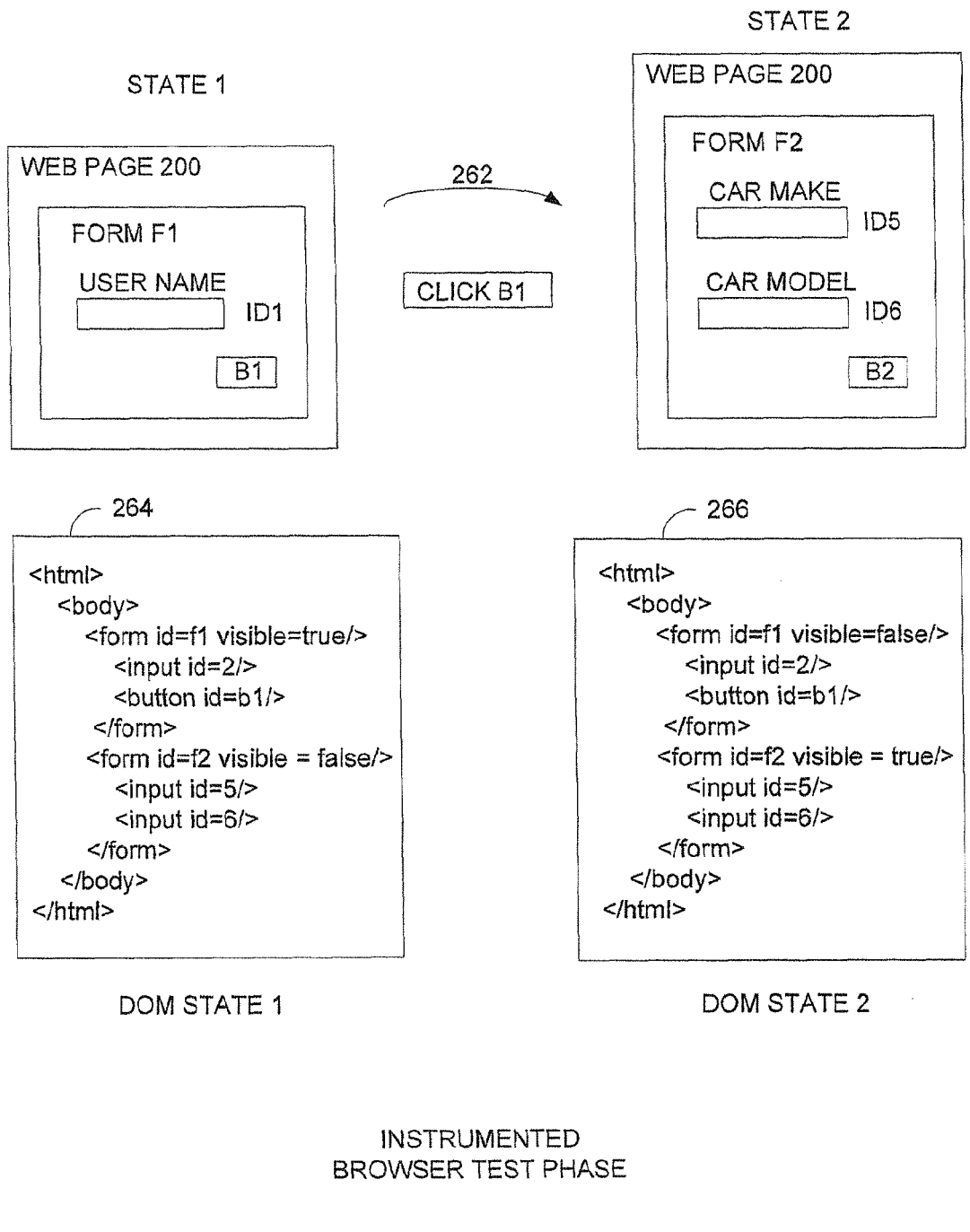
FIG. 14 shows a DOM state change.

FIG. 14 shows in more detail how the test system 102 identifies significant DOM changes. The web page 200 previously shown above in FIGS. 9-11 is again used as an example. The web page 200 contains two forms F1 and F2. Initially only form F1 is visible. After data is entered into field ID1 and button field B1 is selected the web page 200 turns off the visibility of form F1 and turns on the visibility of form F2. In this example, DOM state 1 represents that state of the web page 200 after the user selects and enters data into field ID1 but just prior to the user selecting button field B1.

FIG. 14 shows that in DOM state 1 the visibility of form F1 is turned on (form ID=F1 visible=true/) and the visibility of form F2 is turned off (form id=f2 visible=false/). The DOM state 1 is captured by the test system 102 using the instrumented browser 102 in FIG. 4. As explained above, the instrumented browser 102 generates a binary rendering of the HTML code 264 for web page 200 to generate DOM state 1.

The instrumented browser 120 also captures the UI event 262 where a user selects the button field B1 in web page 200 (CLICK B1). Pursuant to the UI event 262, the instrumented browser 120 captures the next DOM state 2 for web page 200 by generating a binary rendering of the HTML code 266. The DOM state 2 shows that the visibility of form F1 was turned off (form id=f1 visible=false/) and the visibility of form F2 was turned on (form id=f2 visible=true/). The test system 102 compares the changes from DOM state 1 to DOM state 2 to determine what events should be captured during a web session. For example, the transition between DOM state 1 and DOM state 2 significantly changes how the web page 200 is displayed to a user. Therefore, the test system 102 determines the event 262 and associated change from DOM state 1 to DOM state 2 is a significant event and adds the event 262 and DOM change to the event list 280 shown below in FIG. 15.

Figure 15:
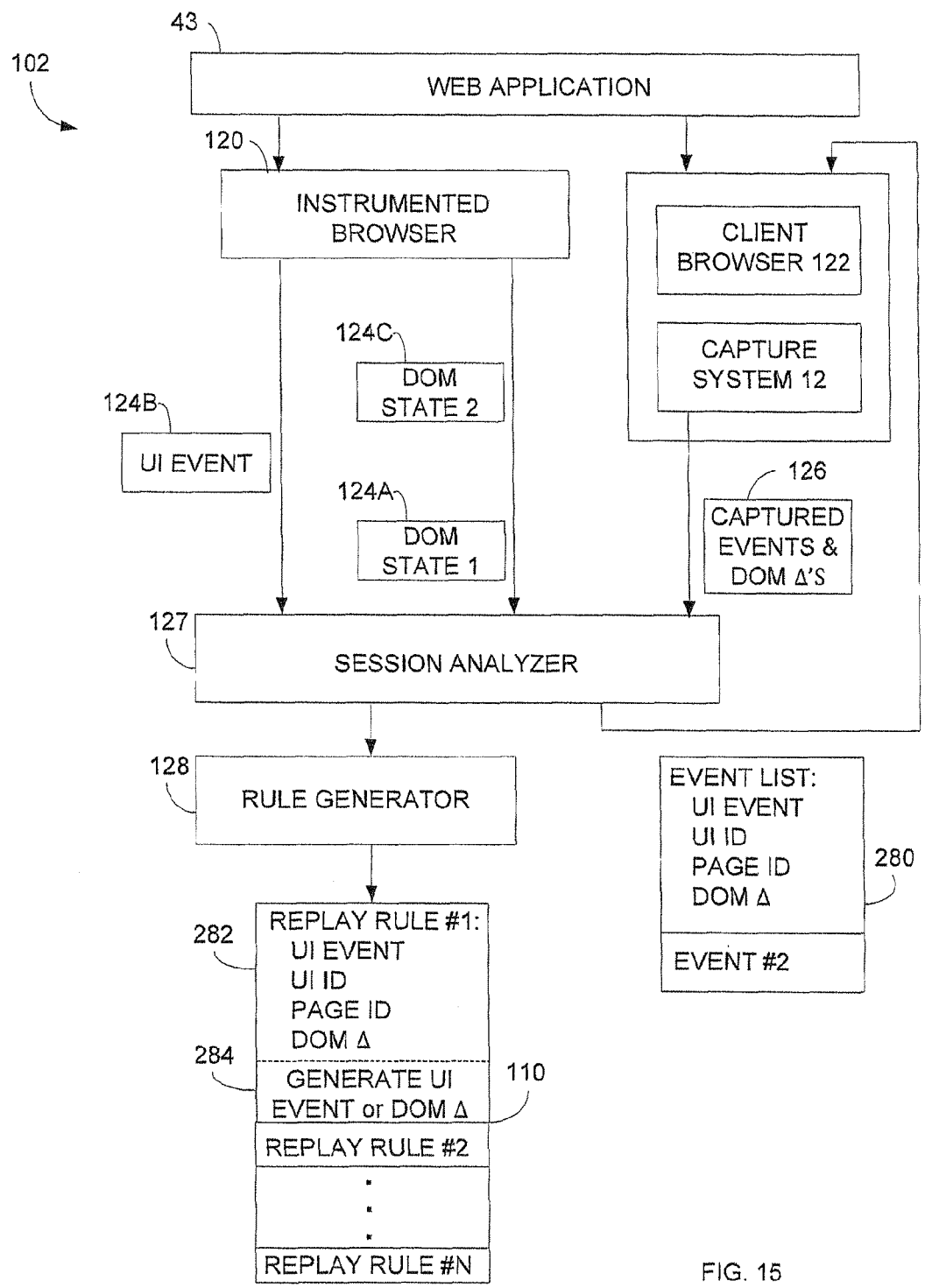
FIG. 15 is a block diagram showing how the test system of FIG. 3 identifies DOM state changes.
Figure 16:
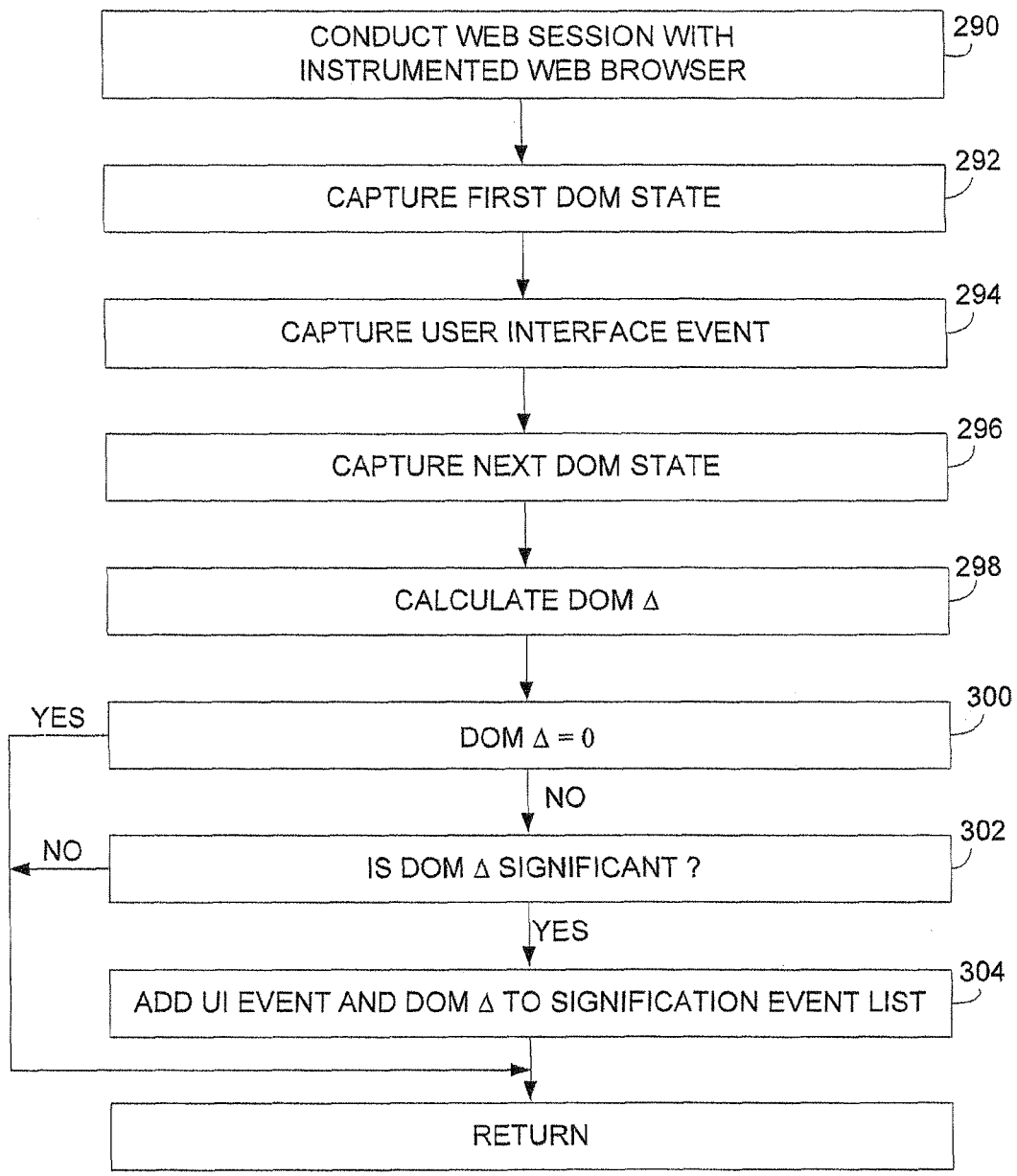
FIG. 16 is a flow diagram showing how the test system of FIG. 15 generates an event list that identifies significant web session events.

FIG. 15 shows in more detail how the test system 102 uses DOM state changes to generate the event list 280 that identifies significant events during client web sessions. FIG. 16 also explains how the event list 280 can be used by the rule generator 128 to generate replay rules 110. Referring to FIGS. 15 and 16, the test system 102 conducts a web session with the instrumented browser 120 in operation 290. The instrumented browser 120 captures a first DOM state 124A in operation 292 and captures a user interface event 124B in operation 294. Responsive to the captured user interface event 124B, the instrumented browser 120 captures a next DOM state 124C in operation 296.

The session analyzer 127 determines the difference between DOM state 124A and DOM state 124C in operation 298. For example, the session analyzer 127 may simply conduct a binary comparison between DOM state 124A and DOM state 124C. If there is no DOM change (DOM Δ) between DOM 124A and 124C in operation 300, there may be no reason to capture the UI event 124B or capture DOM state 124C. In this case, the test system 102 returns to monitoring other UI events and DOM changes for the web session on the instrumented browser 120.

As previously shown in FIG. 14, the session analyzer 127 may identify a significant change between DOM state 124A and DOM state 124C. For example, FIG. 14 showed a DOM change that visually changed a web page 200 from displaying frame F1 to displaying frame F2. This DOM change would be visually significant to the web experience of a user. If a DOM change is identified in operation 300 and the DOM change is determined to be significant in operation 302, the session analyzer 127 in operation 304 creates or adds an entry into the event list 280 that identifies the event 124B that caused the change between DOM state 124A and DOM state 124C. The event list 280 may also include the event identifier, the page identifier for the web page where the event was detected, and the DOM change (DOM Δ) associated with the event 124B. The test system 102 then returns to monitoring the events 124 in the instrumented browser 120 and adds any additional significant events and DOM changes to the event list 280.

The event list 280 can use regular expressions or wild cards to match multiple different event identifiers. For example, a prefix of the event ID may vary on different web pages or different branches of the same web page. However, the suffix of the event ID may stay the same. The session analyzer 127 can use a wildcard in the event ID prefix to identify each instance of that particular event during the web session. For example, *ID The event list 280 is then used either manually or automatically by the capture system 12 to capture both the UI event 124B and the DOM change between DOM state 124A and DOM state 124C. For example, either a programmer, or a program operating in the test system 102, receives the event list 280. Code is then generated for the UI event monitor 16 that monitors for the event 124B during an actual client web session, captures the event 124B, and captures the DOM change between DOM state 124A and DOM state 124C.

Other factors could be also considered in operation 302 to determine which DOM changes are significant enough to add to the event list 280. For example, some threshold number of DOM changes may cause the session analyzer 127 to add the associated event to the event list 280. In another example, any DOM changes associated with a transactional event may be added to the event list 280. For example, any events and associated DOM changes associated with completing a transaction that purchases a product may be added to the event list 280.

Thus, the test system 102 either manually or automatically identifies the events 124 and corresponding DOM changes that are significant to a user web experience. The event list 280 is then used as a reference for either manually or automatically programming the capture system 12 to ensure all significant events in event list 280 are captured during a client web session.

Event Feedback

Figure 17:
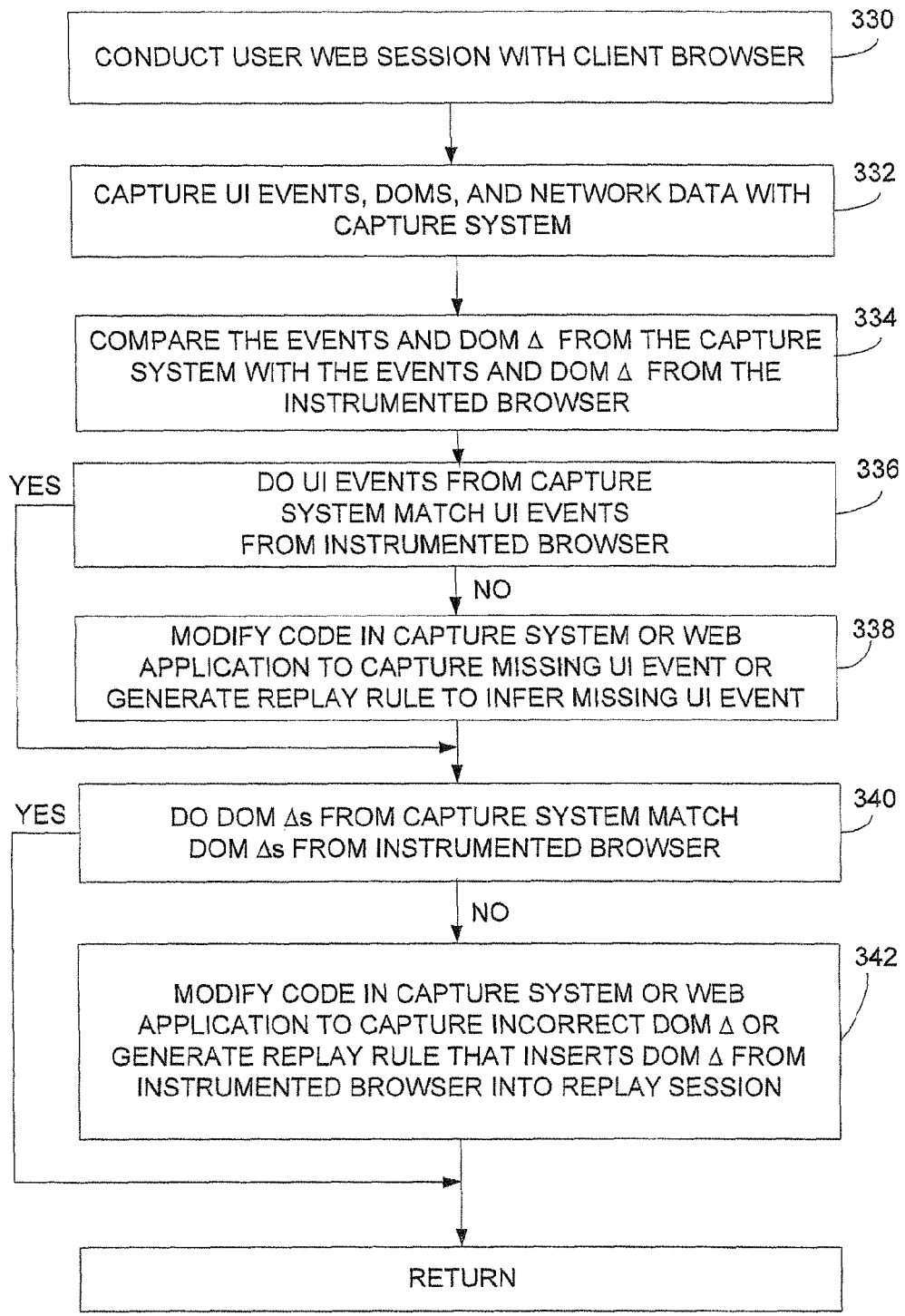
FIG. 17 is a flow diagram showing how the event list of FIG. 16 is used for modifying the capture system of FIG. 1 or generating replay rules.

Referring to FIGS. 15 and 17, the event list 280 can also be used as feedback for identifying missed events and either manually or automatically generating replay rules 110. A web session is performed with web application 43 using the client browser 122 in operation 330. As mentioned above, the client browser 122 in FIG. 15 is the same or similar to the client browser 14 that is normally used by processing device 13 in FIG. 1 during a regular user web session 50 with web application 43. The capture system 12 in FIG. 15 also includes the UI event monitor 16 and network session monitor 36 that would normally be used to monitor the user web session 50. The capture system 12 in operation 332 captures the different UI events, network data, and associated DOMs or DOM changes (DOM Δs) during the client test web session. All of the data captured by the capture system 12 during the test session is referred to generally as captured events 126.

In operation 334 the session analyzer 127 compares the events 126 including the UI events and DOM changes (DOM Δs) from the capture system 12 with the UI events 124B and DOM Δs 124A and 124C captured by the instrumented browser 120. The session analyzer 127 tries to match a particular event generated by the instrument browser 120 with a same event captured by the capture system 12 during a same web session state. For example, the session analyzer 127 may look for the same event occurring on the same web page when the DOM for that web page is in a same state. The session analyzer 127 may use event list 280 to determine which events 124 from the instrumented browser 120 compare with the events 126 from capture system 12.

In operation 336 the session analyzer 127 determines if the captured UI events from the instrumented browser 120 match corresponding UI events captured by the capture system 12. If some UI events are not captured, the capture system 12 may be modified, the web application 43 may be modified, and/or a replay rule 110 may be generated to infer the missed UI event in operation 338.

The session analyzer 127 can generate new entries in event list 280 that identify missed UI events. The event list 280 can then be fed back to the capture system 12 to highlight the missing events. The capture system 12 and/or web application 43 is then either manually or automatically modified to try and capture the missed events identified in event list 280.

The entire web session may be tested again with the client browser 122 and the now modified capture system 12. If the same event is still missed or cannot be captured by the capture system 12, rule generator 128 may create a replay rule 282 in operation 338. The replay rule 282 may include some of the information from the previously generated event list 280 associated with the missed event. For example, the replay rule 282 may include the same UI event, UI event identifier, page identifier, and DOM Δ from the missed event identified in the event list 280. However, the replay rule 282 may also include an associated action 284 that is performed by the replay system 106. For example, the action 284 may cause the replay system 106 to infer and generate a UI event whenever the web session state in replay rule 282 is detected.

As mentioned above, a UI event may be successfully detected by the capture system 12. However, the web session still may not move into the correct DOM state. As described above in FIG. 9, replaying captured events 212 should cause a DOM Δ from DOM state 208 to DOM state 210. However, due to web page logic or some other web page characteristic, the DOM does not move into state 210 during a replay of the captured events.

The session analyzer 127 in operation 340 compares the DOM Δ generated by the instrumented browser 120 with the DOM Δ captured and replayed from the capture system 12. The session analyzer 127 may identify two matching UI events for the same web session state in operation 336 but the associated DOM Δs may not match in operation 340.

Accordingly, the session analyzer 127 in operation 342 may generate an entry in event list 280 that identifies the event and associated incorrect DOM Δ. After the event list 280 is generated for the entire web session, the event list 280 is fed back to the capture system 12 to highlight the incorrect DOM Δ. The capture system 12 and/or web application 43 can then be either manually or automatically modified to try and capture the correct DOM Δ.

The entire web session with web application 43 may be tested again with the client browser 122 and the modified capture system 12 and/or modified web application 43. If the DOM Δ is still incorrect, the rule generator 128 can create a replay rule 282 in operation 342 to infer the DOM Δ during the replay session. The replay rule 282 may also be created if it is impractical to modify either the web application 43 and/or capture system 12.

The replay rule 282 may identify the particular UI event associated with a particular web page state. The associated command 284 may force the replay system 106 to generate the DOM Δ identified by the instrumented browser 120 whenever the associated UI event and web page identified in replay rule 282 is detected by the inference engine 162 during a replay session.

Thus, the test system 102 identifies significant events that need to be captured during a web session, identifies events that are missed by the capture system 12 during the web session, identifies incorrect DOM changes from the captured web sessions, and also generates replay rules that automatically infer the missed event or DOM Δ during replay of captured web sessions.

Identifying Web Application Problems

The test system 102 can identify a variety of problems related to capturing client web sessions. As explained above in FIG. 2, the test system 102 identifies web page logic that prevents child code from bubbling up to parent code. The test system 102 can also identify and compensate for web pages that unintentionally unload event listeners used by the UI event monitor 16 for capturing web session events.

The UI event monitor 16 may capture UI events 34 by attaching listeners to web page elements such as to fields in different web pages. However, some web applications may unload the listeners during a web session. Unloading these event listeners prevent the UI event monitor 16 from capturing subsequent UI events 34 and DOM states. In another situation, web logic in the web page may dynamically generate new DOM elements after an initial page rendering and after the event monitor 16 has already established element listeners. The new dynamically generated DOM elements might not be captured by the UI event monitor 16.

Figure 18:
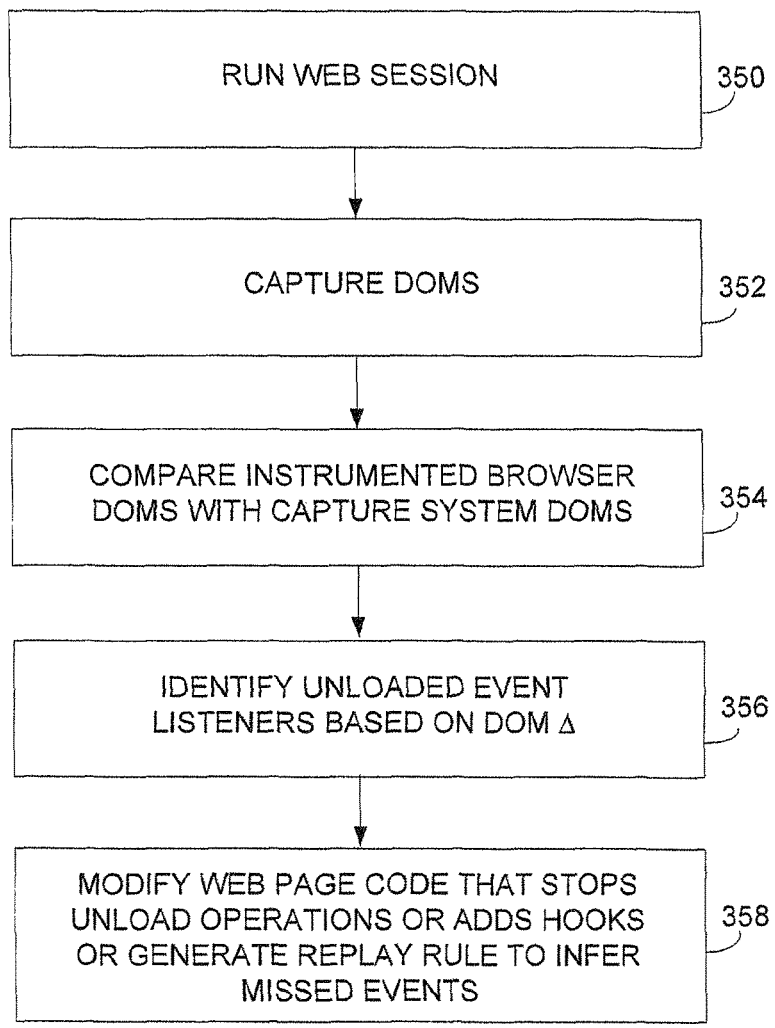
FIG. 18 is a flow diagram showing how the test system of FIG. 15 identifies problems with event listeners.

Referring to FIGS. 15 and 18, the test system 102 tests the web session on both the instrumented browser 120 and on the client browser 122 in operation 350. The capture system 12 captures the DOMs and other events for the web session in operation 352. The session analyzer 127 in operation 354 compares the DOMs obtained from the instrumented browser 120 with the DOMs captured by the capture system 12. The DOMs differences for particular web pages are identified by the session analyzer 127 in operation 356. For example, the instrumented browser DOM may indicate a DOM change that was not detected by the capture system 12.

The identified web pages are further analyzed to identify the problem with the unloaded event listeners or dynamically generated web elements. The web application code can then be modified in operation 358 to either stop unloading the event listeners, provide hooks that cause the UI event monitor 16 to reload the previously unloaded listeners, or allow the UI event monitor 16 to add additional event listeners to the dynamically generated DOM elements. In some situations, the test system 102 may generate a replay rule 110 that causes the replay system 106 to infer the events missed due to the unloaded event listeners.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A method comprising:
capturing a first set of events on an instrumented browser for a first web session with a web application;
capturing a second set of events with a capture system operating with a non-instrumented browser for a second web session with the web application;
identifying differences between the first set of events and the second set of events; and
using the identified differences to analyze performance of the capture system.

2. The method according to claim 1 further comprising using the differences to generate replay rules that infer events missed by the capture system during the second web session.

3. The method according to claim 2 further comprising:
capturing a third set of events with the capture system, wherein the capture system operates with a client browser on a user processing device for a user web session with the web application;
logging the third set of events;
replaying the logged third set of events during a replay session; and
using the replay rules during the replay session to infer events that are not captured by the capture system during the user web session.

4. The method according to claim 3 further comprising:
identifying a User Interface (UI) event that was captured on the instrumented browser during the first web session but was not captured by the capture system during the second web session; and
generating a replay rule that generates the UI event during the replay session of the third set of events.

5. The method according to claim 4 wherein the replay rule triggers the UI event during the replay session in a same order that the UI event that was captured during the first web session.

6. The method according to claim 1 further comprising:
identifying a first set of Document Object Models (DOMs) in the first set of events;
identifying a second set of DOMs in the second set of events; and
comparing the first set of DOMs with the second set of DOMs to identify the differences between the first set of events and the second set of events.

7. The method according to claim 6 further comprising:
identifying a difference between a first DOM change in the first set of DOMs and a second DOM change in the second set of DOMs; and
generating a replay rule according to the difference.

8. The method according to claim 6 further comprising:
identifying a first DOM change (DOM1 Δ) between a first DOM state and a second DOM state in the first set of DOMs;
identifying a second DOM change (DOM2 Δ) between a first DOM state and a second DOM state in the second set of DOMs; and
generating a replay rule when the DOM1 Δ does not match the DOM2 Δ, wherein the replay rule infers the DOMI Δ.

9. The method according to claim 1 further comprising:
identifying a first User Interface (UI) event in the first set of events;
identifying a first Document Object Model change (DOMI Δ) in the first set of events associated with the first UI event;
identifying a second UI event in the second set of events, wherein the first UI event and the second UI event are the same;
identifying a second Document Object Model change (DOM2 Δ) in the second set of events associated with the second UI event; and
generating an event list that identifies the first UI event and the DOM1 Δ when there are differences between the DOM1 Δ and the DOM2 Δ.

10. A test system, comprising:
a computer system configured to compare reference events for a first web session with captured events captured by a capture system during a second web session, the computer system further configured to identify missed events during the second web session according to the comparisons between the reference events and the captured events.

11. The test system according to claim 10 wherein the computer system is further configured to operate an instrumented browser that generates the reference events and is further configured to operate a non-instrumented browser in conjunction with the capture system to generate the captured events.

12. The test system according to claim 10 wherein the computer system is further configured to generate an event list according to the comparison between the reference events and the captured events, the event list identifying a User Interface (UI) event, a UI identifier, a Document Object Model change (DOM Δ) between two DOM states of a web page, and a web page identifier.

13. The test system according to claim 12 wherein the computer system is further configured to generate replay rules from the event list that infer events that were missed by the capture system during the second web session.

14. The test system according to claim 10 wherein the computer system is configured to:
identify a first Document Object Model (DOM) state in the reference events;
identify a second DOM state in the reference events;
identify a first DOM change (DOM1 Δ) between the first DOM state and the second DOM state of the reference events;
identify a first DOM state for the captured events;
identify a second DOM state for the captured events;
identify a second DOM change (DOM2 Δ) between the first DOM state and the second DOM state of the captured events;
identify the missed events by comparing the DOM1 Δ with the DOM2 Δ.

15. The test system according to claim 14 wherein the computer system is further configured to generate a replay rule that forces the DOM1 Δ during a replay session when the DOM2 Δ does not match the DOM1 Δ.

16. The test system according to claim 15 wherein the computer system is configured to identify a User Interface (UI) event associated with DOM1 Δ and DOM2 Δ and generate the replay rule that forces DOM1 Δ when the UI event is detected in the captured events.

17. The test system according to claim 10 wherein the computer system is further configured to:
associate a User Interface (UI) event with a Document Object Model change (DOM Δ) between a first Document Object Model (DOM) state and a second DOM state in the reference events; and
determine if the UI event causes a similar (DOM Δ) in the captured events.

18. The test system according to claim 17 wherein the computer system is further configured to generate a replay rule that infers the U1 event during a replay session when the captured events change from the first DOM state to the second DOM state.

19. The test system according to 10 wherein the computer system is configured to:
identify a particular one of the reference events;
identify any changes in a Document Object Model (DOM) state associated with the particular one of the reference events; and
determine whether or not to capture the particular one of the reference events according the changes, if any, identified in the DOM state.

20. A replay system, comprising:
a replay log configured to log events captured from a monitored client web session;
a session replay controller configured to replay the logged events; and
an inference engine comprising a set of replay rules that correspond with missed events that were not detected during the monitored client web session, the inference engine configured to generate the missed events during a replay session of the logged events according to the replay rules.

21. The replay system according to claim 20 wherein the replay rules include User Interface (UI) events, UI identifiers, Document Object Model differences (DOM Δs), and/or web page identifiers associated with the missed events.

22. The replay system according to claim 20 wherein the inference engine is configured to identify the logged events that correspond with a first replay event in the replay rules and generate a second replay event in the replay rules prior to the replaying the identified logged events.

23. The replay system according to claim 20 wherein the inference engine is configured to force Document Object Model (DOM) changes that would not normally be generated by replaying the logged events during the replay session.

24. The replay system according to claim 20 wherein the replay rules are configured to associate a state of the client web session with a Document Object Model change (DOM Δ), and the inference engine is configured to force the same (DOM Δ) when the state is detected during the replay session.

25. The replay system according to claim 20 wherein the inference engine is configured to compare Document Object Model changes (DOM Δs) in the replay rules with DOM Δs in the logged events.

26. An apparatus, comprising:
a memory configured to store logged events from a monitored client web session; and
a computing device configured to:
infer events that were missed during the client web session; and
generate the inferred events when replaying the logged events.

27. The apparatus of claim 26, wherein the computing device is further configured to generate the inferred events according to replay rules that associate the inferred events with the logged events.

28. The apparatus of claim 27, wherein the computing device is further configured to automatically generate the replay rules by comparing a first set of reference events generated from an instrumented version of a browser with a second set of test events captured by a capture system from a client version of the browser.

29. The apparatus of claim 27, wherein the replay rules are configured to identify User Interface (UI) events where a user initiates an action or enters data into a web page during the client web session.

30. The apparatus of claim 29, wherein the replay rules are configured to identify Document Object Model changes (DOM Δs) associated with the UI events.

* * * * *